United States Patent [19]

Digonnet et al.

[11] Patent Number: 4,938,556
[45] Date of Patent: Jul. 3, 1990

[54] SUPERFLUORESCENT BROADBAND FIBER LASER SOURCE

[75] Inventors: Michel J. F. Digonnet, Palo Alto, Calif.; Karen Liu, Lawrenceville, N.J.; Byoung Y. Kim, Menlo Park, Calif.; Herbert J. Shaw, Stanford, Calif.; John J. Fling, Gaviota, Calif.

[73] Assignee: The Board of Trustees of the Leland Stanford Junior University, Stanford, Calif.

[21] Appl. No.: 281,088

[22] Filed: Dec. 7, 1988

Related U.S. Application Data

[60] Continuation-in-part of Ser. No. 137,870, Dec. 22, 1987, Pat. No. 4,859,016, which is a division of Ser. No. 6/930,136, Nov. 12, 1986, Pat. No. 4,723,824, which is a division of Ser. No. 6/544,888, Nov. 25, 1983, Pat. No. 4,674,830.

[51] Int. Cl.$^5$ ................................................ G02B 6/26
[52] U.S. Cl. ................................ 350/96.15; 330/4.3; 372/6; 372/69
[58] Field of Search ............... 350/96.15, 96.16, 96.29; 372/6, 69, 94, 1; 330/4, 4.3, 5, 84, 85

[56] References Cited

U.S. PATENT DOCUMENTS

| | | | |
|---|---|---|---|
| 3,456,211 | 7/1969 | Koester | 357/71 |
| 3,753,145 | 8/1973 | Chesler | 372/75 |
| 4,515,431 | 5/1985 | Shaw et al. | 350/96.15 |
| 4,546,476 | 10/1985 | Shaw et al. | 372/6 |
| 4,556,279 | 12/1985 | Shaw et al. | 350/96.15 |
| 4,560,234 | 12/1985 | Shaw et al. | 350/96.15 |
| 4,637,025 | 1/1987 | Snitzer et al. | 372/1 |
| 4,674,830 | 6/1987 | Shaw et al. | 350/96.15 |
| 4,693,545 | 9/1987 | Henningsen et al. | 350/96.12 |
| 4,723,824 | 2/1988 | Shaw et al. | 350/96.15 |
| 4,780,876 | 10/1988 | Smith et al. | 372/6 X |
| 4,791,645 | 12/1988 | Komatsubara | 372/1 X |
| 4,794,598 | 12/1988 | Desurvire et al. | 372/3 |

FOREIGN PATENT DOCUMENTS

2844129 4/1980 Fed. Rep. of Germany.

OTHER PUBLICATIONS

Digonnet, "Theory of Superfluorescent Fiber Lasers", Journal of Lightwave Technology, vol. 4, No. 11, Nov. 1986, pp. 1631–1639.

Po et al., "Neodymium Fiber Lasers at 0.905, 1.06, and 1.4 μm", Optical Society of America, 1986 Annual Meeting, p. 103, paper FD4.

Verdeyen, "Amplified Spontaneous Emission (ASE)", Laser Electronics, pp. 179–183.

Bergh, R. A. et al., "An Overview of Fiber Optic Gyroscopes", IEEE Journal of Lightwave Technology, LT-2, pp. 91–107, Apr. 1984.

Liu et al., "10mW Superfluorescent Single-Mode Fibre Source at 1060 nm", Electronics Letters, vol. 23, No. 24, 19th Nov. 1987, pp. 1320–1321.

(List continued on next page.)

Primary Examiner—John D. Lee
Attorney, Agent, or Firm—Knobbe, Martens, Olsen & Bear

[57] ABSTRACT

A superfluorescent broadband fiber laser source comprises a fiber doped with laser material coupled to a multiplexing coupler. In the preferred embodiment, a source of pumping illumination provides pumping light to the doped fiber, and the coupler is adjusted to have a 0% coupling efficiency at the wavelength of the source. The pumping light is sufficiently intense to produce amplified spontaneous emission within the doped fiber, and gives rise to a forward signal and a backward signal. One of the superfluorescent signals is reflected back to the doped fiber by a reflector cemented to one end of the doped fiber or to one end of another fiber through the coupling function of the coupler. The coupler is adjusted to provide complete coupling at the frequency of the lasing light. The temperature dependence of the coupler can be selected to reduce or cancel the temperature dependence of the superfluorescent signal. Other arrangements utilizing the multiplexing properties of the coupler are also described. An all-fiber reflector can also be used.

52 Claims, 8 Drawing Sheets

OTHER PUBLICATIONS

"Fiber Efforts Focus on Manufacture", Laser Focus, Circle No. 12, Apr. 1977, pp. 12–21.

Stone et al., "Nd:YAG Single-Crystal Fiber Laser: Room-Temperature cw Operation Using a Single LED as an End Pump", Applied Physics Letters, vol. 29, No. 1, Jul. 1, 1976, pp. 37–39.

Stone et al., "Neodymium-Doped Fiber Lasers: Room Temperature cw Operation With an Injection Laser Pump", Applied Optics, vol. 13, No. 6, Jun. 1974, pp. 1256–1258.

Burrus et al., "Single-Crystal Fiber Optical Devices: A Nd:YAG Fiber Laser", Applied Physics Letters, vol. 26, No. 6, Mar. 15, 1975, pp. 318–320.

Digonnet et al., "Analysis of a Tunable Single Mode Optical Fiber Coupler", IEEE Journal of Quantum Electronics, vol. QE–18, No. 4, Apr. 1982, pp. 746–754.

Digonnet et al., "Wavelength Multiplexing in Single-Mode Fiber Couplers", Applied Optics, vol. 22, p. 484, Feb. 1, 1983, pp. 484–491.

Liu et al., "Broadband Diode-Pumped Fibre Laser", Electronics Letters, vol. 24, No. 14, Jul. 7, 1988, pp. 838–840.

Gaeta et al., "Pulse Characteristics of Q-Switched Fiber Lasers", Journal of Lightwave Technology, vol. Lt. 5, No. 12, Dec. 1987, pp. 1645–1651.

Miller et al., "A $Nd^{3+}$-Doped cw Fiber Laser Using All-Fiber Reflectors", Applied Optics, vol. 26, No. 11, Jun. 1, 1987, pp. 2197–2201.

Meltz et al., "Cross-Talk Fiber-Optic Temperature Sensor", Applied Optics, vol. 22, No. 3, Feb. 1, 1983, pp. 464–477.

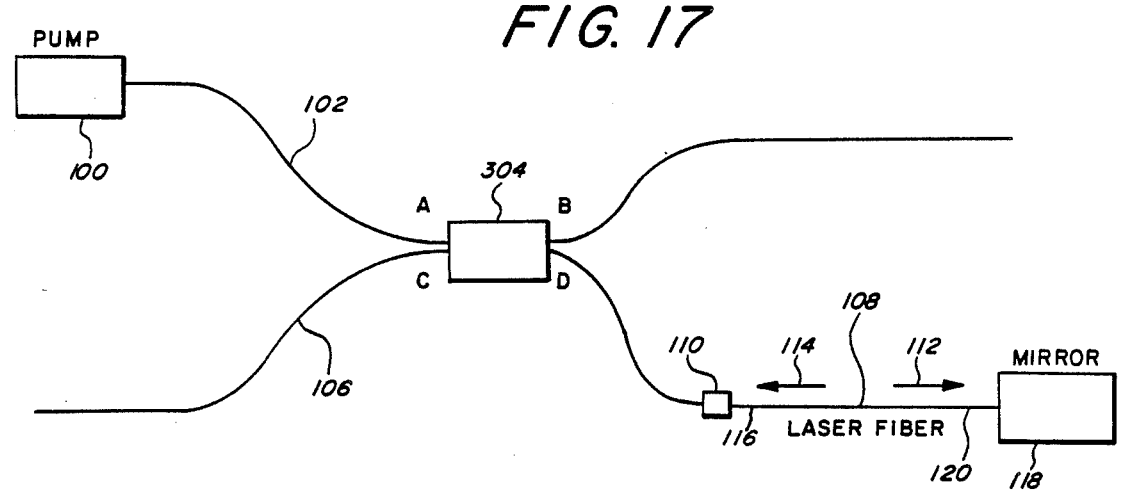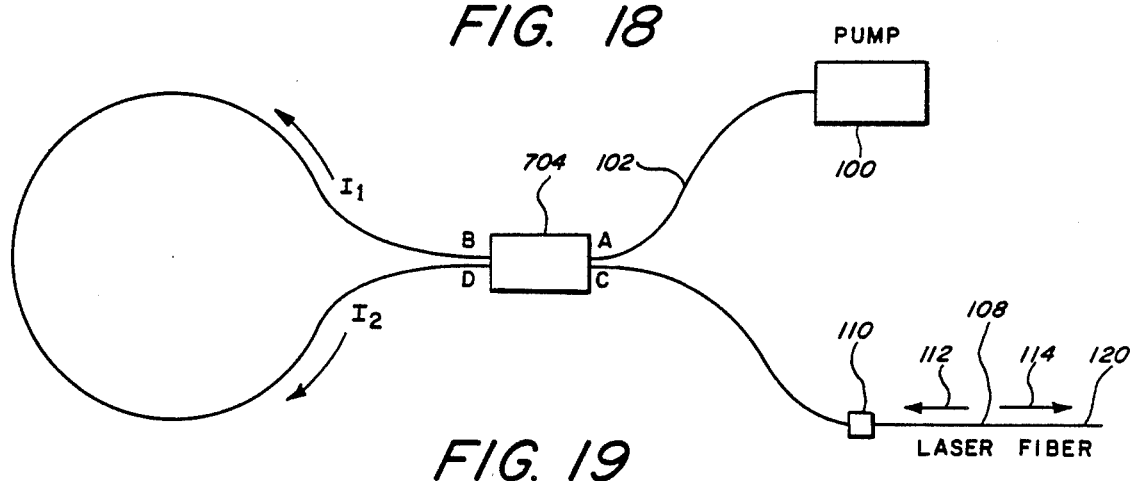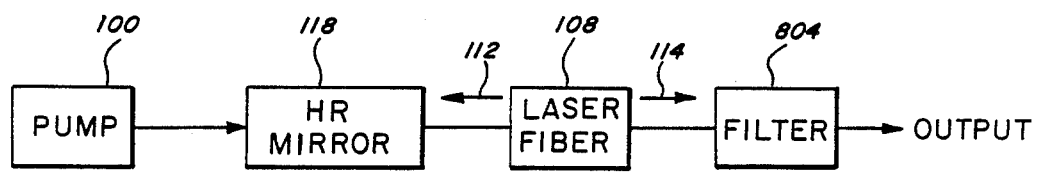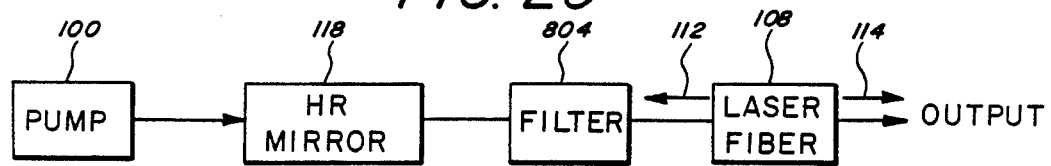

SUPERFLUORESCENT BROADBAND FIBER LASER SOURCE

RELATED APPLICATIONS

This application is a continuation-in-part of U.S. patent application Ser. No. 137,870, filed Dec. 22, 1987, now U.S. Pat. No. 4,859,016 which is a division of U.S. patent application Ser. No. 930,136 filed on Nov. 12, 1986, now issued as U.S. Pat. No. 4,723,824, which is a division of U.S. patent application Ser. No. 554,888 filed on Nov. 25, 1983, now issued as U.S. Pat. No. 4,674,830.

FIELD OF THE INVENTION

The present invention relates generally to fiber optic devices, and more specifically to superfluorescent fiber laser sources for emitting broadband light signals having a low temporal coherence.

BACKGROUND OF THE INVENTION

The advent of optical devices using low temporal processors, has created a need for broadband light sources having a relatively high output and emitting relatively incoherent light signals. In a gyroscope for example, an optical fiber, typically a kilometer or more in length, is wound into a loop and a light signal is recirculated within the loop in both directions. Motion of the loop causes a phase difference between the counterpropagating light signals in accordance with the well-known "Sagnac" effect. This phase difference is then used to measure the gyroscopic rotation. According to the "Sagnac" effect, a rotation of the loop increases the effective path length of one of the counterpropagating light signals. A relative path length difference therefore results in the emerging light signals after circulation through the loop of the two counterpropagating light signals. This path difference is measured by a detector as a phase difference, which is thus indicative of the angular rate of rotation to which the gyroscopic system is subjected. It is desirable that the light signals injected into the loop have a low temporal coherence so as to avoid interference effects from Rayleigh back scattering. As the phase shift induced by rotation is relatively small, any interference effects may indeed substantially alter the phase difference measured by the detector and provide a false measurement of the actual rate of rotation of the loop. Disparity between theoretical predictions and actual results has also been attributed to other non-rotationally induced phase differences such as those associated with residual fiber birefringence. It has also been shown that the use of a broadband light source having low temporal coherence compensates for the Kerr effect. A disclosure of this discovery can be found in PCT Patent Application Serial No. 82/01542 filed on Nov. 1, 1982 and assigned to the assignee of this present application.

A broadband incoherent light source having a lower temporal coherence than laser sources but having a spatial coherence higher than regular thermal incoherent light source is therefore advantageous for introducing light into an optical device such as a gyroscope. Furthermore, it is preferable that these light sources be small and compact and have a low energy consumption.

Light-emitting diodes (LED's) have generally been used for launching light into an optical fiber. A LED emits light under application of current flowing therethrough. The light comes from photons of energy caused by hole-electron combinations. The diode is forward-biased from an external source. Details on the structure of LEDs used for launching a light signal into an optical fiber can be found in: *Fiber Optics* by Robert G. Seippel, Reston Publishing Company, Inc., Reston, Va., pp. 107–116. While a LED emits light that is essentially incoherent and therefore suitable for application in a gyroscope, the output of the light signal emitted by a LED is generally insufficient in intensity and makes difficult the detection of very low rotation rates. Furthermore, the spectrum of wavelengths of the light emitted by a LED is substantially temperature dependent, an undesirable effect for many optical fiber applications such as gyroscopes. Finally, the coupling of a LED to an optical fiber gyroscope is typically of a poor quality.

Superradiant LEDs have also been used to obviate the problem raised by the low energy output of regular LEDs. Although a superradiant LED represents a progress over ordinary LEDs, the light signal coupled into an optical fiber, preferably a single-mode optical fiber, from a superradiant LED is low. Moreover, the temporal coherence of a superradiant LED is not as low as with a regular LED. Furthermore, because the light emitted by superradiant LEDs is the result of band transitions, it is more susceptible to temperature dependence and therefore lacks the stability required for use in gyroscopes and other optical systems.

Semiconductor laser diodes such as Ga(Al)As diode lasers operating continuously at room temperature in the near infrared region emit high output light very suitable for use as light sources in optical systems. However, the temporal coherence of the light emitted by a semiconductor laser diode is typically very high and can cause undesirable effects in an optical system requiring low temporal light such as a gyroscope.

Other miniature broadband optical sources used so far in fiber optic gyroscopes are superluminescent diodes (SLDs). However, SLDs generally fail to satisfy the wavelength stability requirement, as their emission wavelength is very sensitive to temperature (300 ppm/°C.) and optical feedback. In addition, they incur high coupling loss into single-mode fiber, yielding typically only a few mW of usable power. Commercially available superluminescent diodes also exhibit a short lifetime. Moreover, coupling to a single-mode fiber is hindered by the poor spatial coherence of superluminescent diodes. Consequently, none of the non-fiber light sources hereabove described can be considered optimal light sources for use in gyroscopes and other optical devices as they all fail the requirements regarding temperature sensitivity and wavelength stability.

An alternate possibility is the use of high gain fibers optically pumped to a sufficiently high level to generate a significant superfluorescent output via Amplified Spontaneous Emission (ASE) also referred to as superluminescence. Single-mode glass fibers doped with an active ion are good candidates for superfluorescence sources as demonstrated by the high optical gains that they can provide. High gain materials such as Nd:YAG in a fiber form are particularly advantageous in a doped fiber configuration. Doped glass fibers present, however, the desirable advantage of emitting light with a broader spectral range. Recent improvements in the nature of the host material used in doped fibers have allowed superfluorescence to occur in doped fibers without having to resort to high pumping light intensities. A theoretical analysis of ASE in doped fibers is disclosed in an article by Michael Digonnet: "Theory of Superfluorescent Fiber Lasers," *Journal of Lightwave Technology*, Vol. LT-4, No. 11, November 1986. This article is hereby incorporated by reference. An experimental device comprising doped fibers emitting light by ASE was also disclosed in the following two articles: "Superfluorescent Single Mode Nd:Fiber Source at 1060 nm," K. Liu, et al., *Electronics Letter*, Vol. 23, No. 24, November 1987, and in "Neodymium Fiber Laser at 0.905, 1.06 and 1.3 microns," Po, et al., *Optical Society of America Annual Meeting*, Seattle, Wash., October 1986. Both of these articles are hereby incorporated by reference.

Additionally, a light source was disclosed in U.S. Pat. No. 4,637,025 to Snitzer, et al., which utilizes the physical phenomenon of Amplified Spontaneous Emission. This patent is hereby incorporated by reference. The light source described in the aforementioned patent comprises a pump source coupled to a fiber doped with an active laser material. The light emitted by the pump into the optical fiber has an intensity sufficient to produce Amplified Spontaneous Emission in the doped fiber. The resulting emission exits at the one end of the doped fiber which is not coupled to the pump source. In an alternative embodiment disclosed in the aforementioned patent, the backward component of the resulting ASE laser emission is reflected onto a dichroic mirror located between the pumping source and the doped fiber and combined to the forward component.

Although the superradiant light source disclosed by Snitzer is an improvement over light sources heretofore used in gyroscopes, it has several disadvantages that are obviated by the light source of the present invention. In the ASE laser source disclosed by Snitzer, the resulting light signal has at least the same temperature dependence as the ASE source wherefrom it is emitted. As the temperature dependence of an ASE laser source may be relatively high for certain applications, the temperature dependence of the resulting ASE laser source disclosed by Snitzer may not be acceptable for certain applications. Furthermore, in the first embodiment disclosed in the Snitzer patent, the light emitted by the pump source is launched directly into the doped fiber. The forward component traverses the doped fiber once and is therefore amplified by a factor $e^G$, G being the gain of the doped fiber. The backward component of the ASE light signal is fed back into the pump, thereby inducing resonance in the pump cavity and may alter the output of the pump source. In the second embodiment disclosed by Snitzer, a dichroic mirror is used which reflects the ASE signal. A dielectric mirror such as a dichroic mirror is typically formed of multiple dielectric layers stacked on the top of one another. These dielectric layers necessarily reflect a portion of the light impinging upon the surface of those layers and thus reflect some of the pumping illumination emitted by the source back thereto, thereby creating feedback in the cavity of the pumping source. This optical feedback reduces the power of the pump source and also produces fluctuations in the superfluorescence output power. Moreover, the pump light signal is launched through the reflector, which decreases the coupling efficiency of the pump source. Furthermore, a reflector necessarily allows some portion of light to be transmitted even when it is designed to reflect light at a particular wavelength. The interposition of a mirror between the pump source and the doped fiber reduces the feedback induced by the backward component into the cavity of the pump source but by no means eliminates such feedback.

The coupling between the pump source and the doped fiber in the Snitzer embodiments has other disadvantages that are all circumvented in the devices disclosed in the present application. In particular, the pump source in the Snitzer device is coupled to the doped fiber using a longitudinal, parabolic index, self-locating fiber lens or a transverse fiber lens or simply a spherical end on the core of the doped fiber. Optical coupling elements such as lenses or mirrors do not have a very good coupling efficiency. Whenever it is possible, coupling methods employing optical fibers only have been preferred. End-tapering of an optic fiber to be coupled to a pumping source, in particular, substantially increases the coupling efficiency between the pumping source and the optical fiber. This entails, however, that the optical elements to be coupled be made essentially of optical fibers. The coupling optics used in the Snitzer device, however, does not use optical fibers. The Snitzer device does not use the excellent coupling properties of optical fibers and is not even designed to be able to use them.

Thus, there is a need for a light source that emits light having low temporal coherence, high intensity, high spatial coherence, low temperature dependence and well adapted for use in fiber optic devices.

SUMMARY OF THE INVENTION

According to the present invention, in a first aspect, there is disclosed a fiber optic system comprising a source for emitting pumping light at a first spectrum of wavelengths, an optical fiber doped with a laser material, the intensity of the pumping light at the first spectrum of wavelengths being sufficient to induce superfluorescent emission of laser light in the laser material at a second spectrum of wavelengths, the laser light comprising first and second components, the first and second components being substantially contradirectional at locations where the laser light is emitted, an optical coupler having at least a first port and a second port, the first port coupled to the pump source to receive the pumping light from the pump source, the second port coupled to a first end of the doped fiber so that the pumping light coupled by the coupler from the first port into the second port is launched into the doped fiber, the coupler selectively coupling one of the first and second spectrum of wavelengths and inhibiting coupling of the other of the first and second spectrum of wavelengths and a reflector for reflecting at least one of the first and second light components.

In one preferred embodiment of the present invention, the coupler preferably provides substantially full coupling of the pumping light at the first spectrum of wavelengths and substantially inhibits coupling of the laser light at the second spectrum of wavelengths.

In another preferred embodiment of the present invention, the coupler provides substantially full coupling of the laser light at the second spectrum of wavelengths and substantially inhibits coupling of the pumping light at the first spectrum of wavelengths.

The coupler may also provide substantially 50% coupling of the laser light at the second spectrum of wavelengths and substantially inhibits coupling of the pumping light at the first spectrum of wavelengths.

Typically, the coupler has a third port, the reflector being coupled to the coupler at the third port so as to reflect light emanating from the third port of the coupler back to the third port of the coupler.

The reflector is advantageously coupled to a second end of the doped fiber, the laser light exiting the doped fiber via the first end of the doped fiber.

In such an embodiment, the laser light typically exits the doped fiber via the coupler at another port of the coupler.

In another preferred embodiment of the present invention, the coupler may have a third and a fourth port, and the reflector may comprise an optical fiber forming a loop between the third and fourth ports.

Ideally, the doped fiber is a single-mode fiber doped with the laser material. The coupling of light in the coupler is typically due to evanescent field coupling. The first spectrum of wavelengths essentially comprises the wavelength at 806 nm, whereas the second spectrum of wavelengths essentially comprises the wavelength at 1060 nm. The laser material preferably comprises a rare earth ion, whereas the doped optical fiber is preferably made of a host glass selected from the group essentially consisting of alkali, alkaline earth silicates, silicates, germinates, phosphates or borate glasses. The rare earth material is preferably neodymium, ytterbium, erbium.

In the preferred embodiments of the present invention, the doped fiber is either fused or spliced to an optical fiber for coupling with the second port of the coupler. The reflector is preferably a dielectric mirror but may also comprise a metallic mirror. As to the source, it is preferably a laser diode or a dye laser.

According to the present invention in a second aspect, there is disclosed a fiber optic light source comprising a optical fiber doped with laser material absorbing light at a first spectrum of frequencies and emitting light at a second spectrum of frequencies and a coupler for directing light emitted from a pump source at the first spectrum of frequencies into one end of the doped fiber, the intensity of the pumping light being sufficient for inducing amplified spontaneous emission of light at the second spectrum of frequencies in the laser material, the coupler having a different coupling efficiency for the first spectrum of frequencies and the second spectrum of frequencies. Preferably, the light emitted by this fiber optic light source at the second spectrum of frequencies has a broad bandwidth.

The present invention also describes an apparatus comprising a source of pump light having a first spectrum of wavelengths, an optical fiber doped with a laser material, the optical fiber emitting light at a second spectrum of wavelengths in response to pumping at the first spectrum of wavelengths and an optical coupler having an input port and an output port, the input port coupled to the pump source to receive light from the pump source, the output port coupled to the optical fiber for pumping the laser material, the coupler being wavelength discriminating so as to selectively couple one of the first and second spectrum of wavelengths and inhibit coupling of the other of the first and second spectrum of wavelengths.

According to another aspect of the present invention, there is described a fiber optic system comprising a pump source for emitting pumping light at a first spectrum of frequencies, a coupler including a first and a second strand of optical fiber juxtaposed to provide coupling of light between the first and second lengths, each of the first and second lengths of optical fibers having respectively a first end portion and a second end portion, the pump source being coupled to the first end portion of the first optical fiber length and an optical fiber doped with laser material, the intensity of the pumping light being sufficient to induce superfluorescent emission of laser light in the laser material at a second spectrum of frequencies when the laser material is pumped with the pumping light, the doped optical fiber coupled to one of the first and second lengths of optical fiber, the coupler having a different coupling efficiency for the first spectrum of frequencies and the second spectrum of frequencies. Evanescent field coupling is preferably used.

The laser light typically comprises at least a first and a second component, the first and second components being substantially contradirectional at locations where the laser light is emitted. A reflector is preferably provided for reflecting one of the first and second laser light components. This reflector can be coupled to one end of the doped optical fiber or to the first end portion of the second length of optical fiber. The coupling efficiency is preferably substantially zero for the first spectrum of frequencies and substantially one for the second spectrum of frequencies.

In this latter embodiment, the doped fiber is coupled to the second end portion of the first length. Typically, the coupling efficiency is substantially one for the first spectrum of frequencies and substantially zero for the second spectrum of frequencies. It may also be substantially zero for the first spectrum of frequencies and substantially 0.5 for the second spectrum of frequencies.

In either case, the doped fiber is preferably coupled to the second end portion of the second length of optical fiber. The first and second lengths may also form a single, continuous length of optical fiber, the optical fiber forming a loop portion and two line portions respectively connected to the pump source and the doped optical fiber.

According to another aspect of the present invention, there is described a fiber optic system comprising a pump source for emitting pumping light at a first spectrum of frequencies, an optical fiber doped with laser material, the intensity of the pumping light being sufficient to induce emission of laser light in the laser material at a second spectrum of frequencies when the laser material is pumped with the pumping light, the laser light having at least a first and a second component, a filter for filtering at least one of the first and second components of the laser light, the filter having a selected low temperature dependence so that the laser light filtered by the filtering means is essentially less temperature dependent than unfiltered laser light and a reflector for reflecting at least one of the first and second components of the laser light. The laser light is preferably induced by superfluorescence.

In this embodiment, the reflector may be interposed between the pump source and the doped optical fiber, the reflector selectively transmitting the pumping light at the first spectrum of frequencies and reflecting the laser light at the second spectrum of frequencies, whereas the doped optical fiber may be interposed between the reflector and the filter. The filter may also be interposed between the reflector and the doped optical fiber. The fiber optic system may also comprise a second reflector for forming a resonant cavity within the doped fiber. The laser light may have a broad or a narrow bandwidth.

The present invention also discloses a method of producing light having low temporal coherence comprising the steps of providing a source of pumping illumination at a first spectrum of frequencies, pumping an optical fiber doped with laser material with the pumping illumination so as to produce emission of superfluorescent light in the laser material at a second spectrum of frequencies, the superfluorescent light having at least two components and multiplexing the pumping light and the superfluorescent light in an optical coupler which is connected to the optical doped fiber and the source and which has a different coupling efficiency for the first spectrum of frequencies and the second spectrum of frequencies.

This method preferably comprises the steps of reflecting at least one of the components of the superfluorescent light and directing the reflected component into the optical doped fiber.

According to another aspect of the present invention, there is disclosed a method of producing light having low temporal coherence and a low temperature dependence comprising the steps of providing a source of pumping illumination at a first spectrum of frequencies, pumping an optical fiber doped with laser material with the pumping illumination so as to produce emission of laser light in the laser material at a second spectrum of frequencies, the laser light having at least two components, filtering at least one of the first and second components of the laser light using a filter having a selected temperature dependence so that the filtered component has a lower temperature dependence than the unfiltered light and reflecting at least one of the first and second components back into the doped optical fiber. The pumping step comprises the step of inducing superfluorescence in the doped fiber.

According to another aspect of the present invention, there is disclosed a method of producing light having low temporal coherence and a low temperature dependence, comprising the steps of providing a source of pumping illumination at a first spectrum of frequencies, pumping an optical fiber doped with laser material with the pumping illumination so as to produce emission of laser light in the laser material at a second spectrum of frequencies, the laser light having at least two components and a first temperature drift, selecting an optical coupler having a predetermined second temperature drift substantially equal and of opposite direction to the first temperature drift of the laser light, and coupling at least one of the first and second components of the light using the coupler so as to produce a coupled component having a third temperature drift, whereby the third temperature drift of the coupled component is substantially cancelled or minimized.

The present invention also discloses an apparatus comprising a fiber optic coupler including a pair of optical fibers juxtaposed to provide coupling of light at a first spectrum of frequencies between the fibers and to prohibit coupling of light at a second spectrum of frequencies between the fiber, a source of pumping illumination coupled to a first end of one of the pair of fibers, the pumping illumination having the first spectrum of frequencies and a source of a signal to be amplified coupled to a first end of the other of the fibers, the signal to be amplified having the second spectrum of frequencies, and an optical fiber comprising a laser material, the laser material possessing a laser transition at one of the second spectrum of frequencies of the signal to be amplified of the material is pumped with the pumping illumination, the optical doped fiber coupled at one end to a second end of one of the pair of fibers.

BRIEF DESCRIPTION OF THE DRAWINGS

These and other advantages of the present invention are best understood through reference to the following description and to the drawings, in which:

FIG. 17 is a schematic diagram of a fourth embodiment of the present invention;

FIG. 18 is a fifth embodiment of the present invention incorporating an all-fiber reflector;

FIGS. 19 and 20 are schematic block diagrams illustrating fifth and sixth embodiments of the present invention utilizing a filter.

DETAILED DESCRIPTION OF THE PREFERRED EMBODIMENTS

Figure 1A:
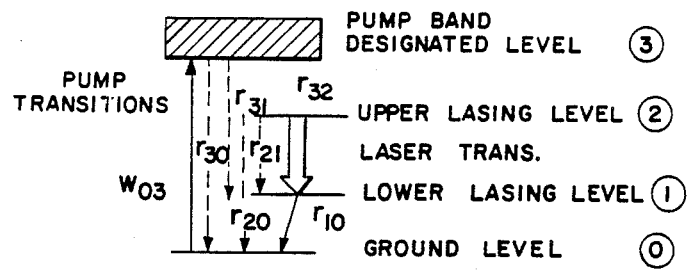
FIGS. 1a and 1b are simplified energy level diagrams of a four-level doped fiber using a doped material such as Nd:YAG.

The preferred embodiments of the present invention are based on a physical phenomenon referred to as "superfluorescence" or "amplified spontaneous emission." This phenomenon plays an important role in the preferred embodiments of the present invention and a discussion of superfluorescence is presented hereinbelow.

SUPERFLUORESCENCE: THEORETICAL BACKGROUND

Superfluorescence was generally regarded by laser experimenters and designers as a parasitic effect which would interfere with the signal amplification occurring in a laser cavity. In particular, superfluorescence played a highly undesirable role in numerous large high-gain laser systems as will be described below.

It is well known to place a pumping light source and a lasing material in a tubular cavity, such that the light source emits light at wavelengths corresponding to the absorption spectra of the lasing material. The ions, molecules or atoms of the laser material are then inverted to an energy level above the upper lasing level. After inversion, an initial relaxation of the molecules, ions or atoms of the lasing material through phonon radiation yields an ion, molecule or atom population at the upper lasing level. From this level, the ions, molecules or atoms will relax to a lower lasing level, emitting light at a wavelength which is characteristic of the lasing material. It is preferable that the lower lasing level be above the ground level so that a rapid, phonon-emitting relaxation occurs between the lower lasing level and the ground level, enabling a high inversion rate to exist between the upper and lower lasing levels within the pumped ions, molecules or atoms.

With the population so inverted, as is well known from laser technology, the lasing material provides a very slow fluorescence, that is, random emission of incoherent light. In the case of a Nd:YAG crystal, the average lifetime of the neodymium ions in the inverted state is 230 picoseconds. The energy represented by the population inversion can therefore be extracted as broadband radiation and can be quite intense. This phenomenon is generally known as amplified spontaneous emission (ASE) or also superfluorescence. Despite some dissensions among purists with respect to the use of those terms, ASE and superfluorescence will hereinafter be used interchangeably. In an optical amplifier, ASE limits the amount of gain and is an undesirable effect. In conventional amplifier systems, ASE originating from any point in the lasing material can impair the integrity of the laser pulse itself and substantially drain stored energy from the lasing medium. ASE can also reduce the effective stored energy in an amplifier system by parasitic mode generation in individual amplifier units and in combination with certain optical elements within the optical system. Theoretical calculations show that if certain conditions hold, ASE extracts the energy from the inversion as fast as the pumping source can create it. Amplified spontaneous emission is regarded as a serious problem in high-gain laser systems, possibly leading to damages of optical components of the laser system. Technical details relating to the problems caused by ASE and describing this phenomenon can be found in the following references: *Laser Electronics*, John T. Verdeyen, Prentice-Hall, pp. 179–183, and in *Lasers* by Siegman, University Science Books, pp. 555–556.

Figure 1B:
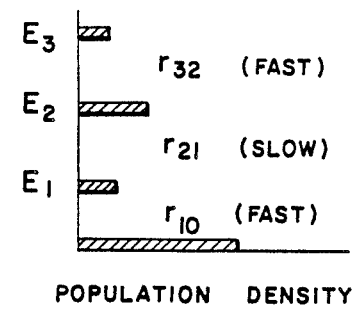

FIG. 1a illustrates the different energy levels involved in spontaneous and stimulated emissions for the Nd:YAG crystal. It will be understood that when pump light at the absorption wavelength of the crystal is absorbed by the Nd:YAG crystal, the neodymium ions are excited from the ground state to the pump band. From the pump band, the ions quickly relax, through phonon interactions, to the upper lasing level. From this upper lasing level, the neodymium ions will undergo a relatively slow fluorescence to the lower lasing level. From this latter level, a final rapid phonon relaxation occurs to the ground state. This latter rapid relaxation in a full level laser system of the type shown in FIG. 1a is all the more advantageous since the rapid phonon relaxation between the lower lasing level and the ground state provides a practically empty lower lasing level. This feature is shown in FIG. 1b, in which the population densities at the pump band, upper lasing level, lower lasing level and ground state are shown for the Nd:YAG crystal during continuous pumping. Because the rate of fluorescence between the upper lasing level and lower lasing level is relatively slow in comparison with the phonon relaxation between the pump band and the upper lasing level, as well as between the lower lasing level and the ground state, the population density at the upper lasing level is substantially higher than that of the lower lasing level, yielding a high inversion ratio. The average lifetime of neodymium ions at the upper lasing level, prior to spontaneous fluorescence, is about 230 picoseconds at 300° K. in Nd:YAG. In order for the pumping light to give rise to superfluorescent emission, the intensity of the pumping light must be sufficiently high such that a population inversion occurs, presenting conditions leading to amplified spontaneous emission with stimulated emission.

Figure 2:
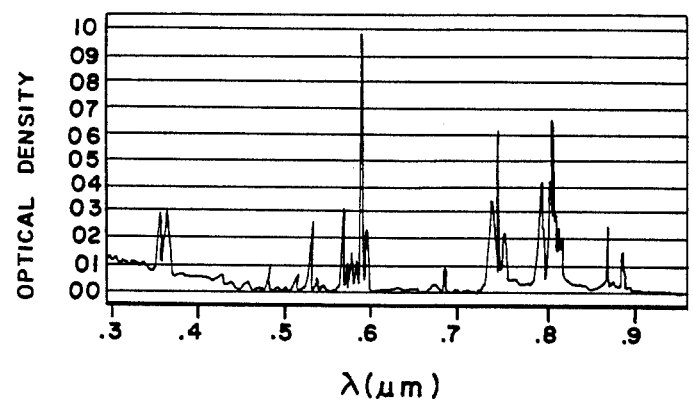
FIG. 2 is a diagram showing the absorption spectrum of Nd:YAG at 300 K.

Referring now to FIG. 2, which is a diagram of the absorption spectrum of Nd:YAG crystal at 300° K., it can be seen that Nd:YAG material has a relatively high optical density, and thus a short absorption length, at selected wavelengths. For this reason, it is advisable to select the wavelength of the pumping illumination source in order to permit the absorption length to be as short as possible. This will permit substantially complete absorption of the pumping illumination within a very short length of the Nd:YAG crystal. Although it appears from FIG. 2 that the wavelength 0.58 micron is best suited for pumping illumination, the wavelength 0.81 micron is preferably selected in the embodiments of the present invention using Nd:YAG crystal as the laser medium.

Superfluorescent sources have been recently considered as candidates for low temporal coherence sources in many optical applications, in particular fiber gyroscopes and in some signal processing fiber systems. A superfluorescent source typically comprises a lasing cylinder end-pumped by a pumping source. The pump illumination launched into the lasing cylinder by well known coupling methods is sufficiently intense so as to present conditions leading to ASE. The resulting output laser beam is emitted at one end of the lasing cylinder after the beam has traversed the cylinder and undergone amplification by the group of atoms which initially emitted the beam. The output beam has characteristics intermediate between a truly coherent laser signal and a completely incoherent thermal source signal. In particular, the output beam has a low temporal coherence but a fair amount of spatial coherence. As mentioned hereabove, ASE is characterized by laser theorists as the phenomenon of light emission in which the spontaneous emission coming from a distribution of inverted laser atoms is linearly amplified by the same group of atoms. The gain should be substantial at least in one direction through the atoms. If the laser medium is large enough (long, thin cylinder of inverted atoms), the signal emitted and amplified by these atoms can produce an output beam which can be of high intensity, moderately directional and with very low temporal coherence. If the output radiation becomes strong enough, significant saturation along the gain medium can be achieved so that the major portion of the inversion energy is extracted into the directional output beam. A complete discussion of ASE can be found in *Lasers* by Siegman, University Science Books, pp. 547–556.

Superfluorescence, despite its spurious effects in certain high-gain amplifiers, thus presents several advantages, in particular in connection with optical fibers. These advantages open a new realm of possibilities, as will be shown by the detailed description of the preferred embodiments of the present invention.

DESCRIPTION OF THE FIRST EMBODIMENT

Figure 3:
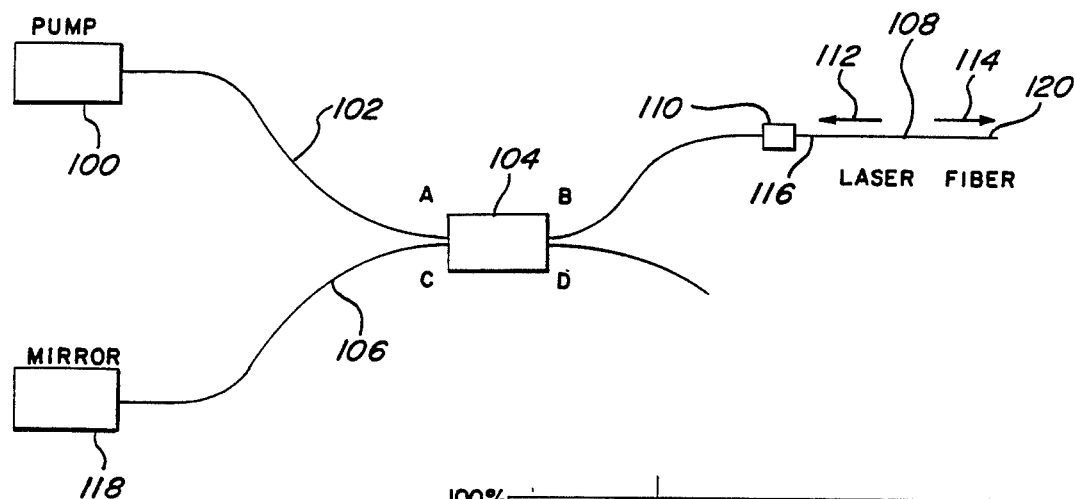
FIG. 3 is a schematic diagram showing the first preferred embodiment of the present invention.

Reference is now made to FIG. 3 which illustrates the first preferred embodiment of the present invention.

A source of pumping illumination 100 is coupled to a fiber 102 of a multiplexing coupler 104 to provide pumping illumination at port A of the multiplexing coupler 104. The coupler 104 preferably comprises two strands of optical fibers, the uppermost fiber 102 and a lowermost fiber 106. The pumping illumination from the source 100 is then transmitted to port B through the coupling action of the coupler 104, as described in further detail hereinbelow. The coupler 104 is indeed adjusted to have a 0% coupling efficiency at the wavelength of the source 100. A doped fiber 108, preferably an Nd:silica doped fiber, is coupled to port B of the coupler 104 by means of splices or other fiber connecting means 110 (butt joint or fused splice, for example). The illumination signal is sufficiently intense to produce amplified spontaneous emission within the doped fiber 108, thereby giving rise to a forward signal 114 and a backward signal 112 as indicated by the arrows in FIG. 3. The signal emitted in the case of a Nd:silica doped fiber is in a range of wavelengths centered about 1060 nm, the full width at half maximum (FWHM) being generally approximately 17 nm. The forward signal 114 exits the doped fiber 108 at the end 120 thereof after travelling one length of the doped fiber 108. The backward signal 112 is launched into the coupler 104 at port B and is transmitted to port C through the coupling action of the coupler 104. The multiplexing coupler 104 is effectively fabricated for use in this invention to provide complete coupling of the lasing light at 1060 nm, while providing essentially no coupling at the wavelength of the pumping light at 800 nm or another wavelength suited for pumping illumination. A mirror or reflector 118 is attached, preferably cemented to the end of the lowermost fiber 106 of the coupler 104. The mirror 118 is designed to provide complete or quasi complete reflection at the wavelength of the output signal. The mirror 118 is preferably a dielectric mirror formed of multiple layers of dielectric material. The mirror 118 is typically cold-deposited on one end of the fiber 106 or bonded thereto according to techniques well-known in the art. Furthermore, the mirror 118 is selected such that the reflection of the backward signal 112 does not alter the wavelength thereof. The backward signal 112 is thus reflected back to port C and reinjected into port B of the coupler 104 through the same coupling action of the coupler 104. The backward signal 112 travels across the entire length of the doped fiber 108 and exits at the end 120 thereof. If G is the gain experienced by the signal during its traverse of the doped fiber 108, it is apparent that the forward signal 114 is approximately amplified by a factor $e^G$ when it exits the doped fiber 108, whereas the backward signal 112 is amplified by a factor $e^{2G}$ as it traverses the doped fiber 108 in two directions. If the gain G is high, it is clear that the output signal will be comprised principally of the backward signal 112. Such arrangement is extremely advantageous to increase the intensity of the total output signal.

It should be noted that reflection occurs only at one end of the doped fiber 108, thereby preventing resonant laser oscillations and preserving the conditions for broadband amplified spontaneous emission.

The optical system of the present invention therefore provides a convenient means to generate a superfluorescent signal by wavelength dependent coupling of a pump source to a doped fiber, while preventing loss of the backward laser signal by means of a mirror placed at one end of the fiber coupled to the coupler. Typical outputs in the order of 10–15 mW have been obtained with a linewidth of about 17 nm (FWHM) in a single mode Nd:SiO$_2$ fiber pumped near 810 nm with a CW Styryl 9 dye laser. Most of the output consists of the 1060 nm emission.

Referring again to FIG. 3, the various optical components used in the first embodiment of the present invention will be described in further details hereinbelow.

The pump source 100 may be a laser diode which permits high concentrations of pump power in the fiber and thus in the doped fiber. Regardless of the type of pumping source utilized, the efficiency of the system will be enhanced if the wavelength of the radiation from the source corresponds with a peak in the absorption spectrum of the doped fiber, for example, of an Nd:silica doped fiber as shown in FIG. 2. Electroluminescent diodes are commercially available with appropriate dopings to emit light in the 800 nm range. The spectrum of such diodes matches quite well the absorption spectrum of Nd:silica material at room temperature. For example, commercially available Ga(Al)As LEDs provide radiation spectra which are strong in the 800 nm region. Similarly, laser diode structures are commercially available which emit energy over the 850 nm range. In addition, the pump wavelength should be as close to the signal wavelength as allowed by the spectroscopy of the Nd:silica material to maximize the overall pumping efficiency. The preferred embodiment of the present invention utilizes a cw styryl laser dye pump source readily available in the commerce to emit in the range of 800–830 nm. Such a laser source coupled into an optic fiber may allow an 80% transmission at the wavelength of the light emitted by the source. Typically, the FWHM of such a laser pump source is approximately 30 nm.

It will be apparent to the person skilled in the art that the wavelength of the pump source light preferably corresponds to a peak in the absorption spectrum of the lasing material. In the case of Nd, this peak is selected at 804 nm. However, for practical considerations, a proximate wavelength such as 820 nm is acceptable. When silica is used as the host material of the doped fiber, it has been observed that of the two emission lines of Nd:SiO$_2$ (900, 1060 nm), only the 1060 nm line reflected by the mirror has large net gain. The 900 nm line is simply self-absorbed in the fiber. Other weaker emission lines may be present but are too weak to be detected by commercial silicon detectors.

The doped fiber 108 used in the device of the present invention is readily commercially available. It comprises a core, preferably fabricated from a host glass doped with an active laser material and a cladding that surrounds the core.

In its preferred embodiment, the doped fiber 108 includes a core fabricated from a host glass doped with an active laser material and a cladding that surrounds the core. Alternatively, the cladding can contain the actual laser material in a thin layer adjacent to the core so that the single-mode light distribution overlaps the active material. The preferred active material is neodymium, although other rare earth materials including ytterbium and erbium are likewise suitable. The concentration of the dopant in the host glass can vary from a lower limit determined by convenience in length to absorb the pump light and to avoid light loss from excessive lengths required for the particular application and an upper limit determined by concentration quenching. In general, a concentration range between 0.1 and 30% (by weight) is suitable. The preferred host glasses include the alkali, alkaline earth silicates, although other silicates, germinates, phosphates and some borate glasses are likewise suitable. The index of refraction of the core is selected to be higher than that of cladding so that the pumping light introduced into the core and light emitted by the active material is contained within or in the vicinity of the core. The diameter "D" of the core is preferably determined, in part, by the particular application, that is, the diameter of optical fiber into which the light output of the light source 100 is introduced. In general, the diameter of the core is preferably the minimum necessary into which pump light can be efficiently coupled for the particular application to maximize the radiant energy emitted per unit area for a particular pumping light energy level. Thus, where the light source 100 is to supply light to a single-mode optical fiber or device, the diameter of the core is selected to give single-mode light transmission at the emission wavelength. For a single-mode transmission, the diameter of the core depends on the indices of refraction of the core and cladding; a diameter of 1–20 microns, or even up to 50 microns, for wavelengths in the near infrared and visible region of the light spectrum can provide single-mode transmission. If desired, the diameter of the core can be larger than the minimum for the particular application. For example, where the light source 100 is to be coupled to a single-mode doped fiber having a core diameter of 4 microns, the core can have a somewhat larger diameter, e.g., 6 microns, to facilitate coupling. In general, for a circular cross section of the core, the core size is determined by making $(\pi d/\mu)NA$ equal to or less than 2.4 where d is the core diameter, $\lambda$ is the wavelength of the emitted light, and NA is the numerical aperture which is related to the indices of refraction of the core and cladding, $n_1$ and $n_2$, by NA equals $(n_1^2 - n_2^2)^{\frac{1}{2}}$.

In the preferred embodiments of the present invention, silica or YAG is used as host materials, whereas neodymium or erbium constitute the lasing material. The diameter of the doped fiber 108, preferably a Nd:silica doped fiber, may be extremely small in comparison with the diameter of Nd:silica rods used in prior art optical systems. For example, an optical system has been constructed wherein the fiber has a diameter of 100 microns. Even smaller diameters are feasible, approaching the diameter of a single-mode fiber. Coupling between the fiber and the crystal in single crystal fiber lasers is enhanced as the diameter of the crystal is reduced and signal gain is increased since density of pumping illumination from the source within the crystal increases as the crystal diameter is reduced.

The advantages of doped fibers are numerous and include their high gain, excellent conversion efficiency and interfaceability to single-mode silica fibers, low propagation loss and compactness. A more complete review of the characteristics of doped fibers can be found in U.S. Pat. No. 3,456,211 to Koester, issued on July 15, 1969. This reference is hereby incorporated by reference.

The multiplexing coupler utilized in the preferred embodiment of present invention selectively couples a first optical frequency while not coupling a second optical frequency. In the preferred embodiments of the present invention, polished fiber couplers are used. Other fiber multiplexers are also suitable, such as fused biconical-taper couplers or integrated optics couplers. Polished fiber couplers, as well as methods for constructing the same, required for such selective coupling are disclosed in U.S. Pat. No. 4,556,279, published on Dec. 3, 1985, and listing Herbert J. Shaw and Michael J. F. Digonnet as inventors, assigned to the assignee of the present invention. That patent is hereby incorporated by reference.

Background information on optical couplers may be found in U.S. Pat. Nos. 4,515,431 and 4,674,830 assigned to the assignee of the present invention. Both patents are hereby incorporated by reference.

The principal characteristics of polished cladding multiplexing couplers and their method of manufacture can be found in the aforementioned patents and can be summarized in the following manner.

Figure 4:
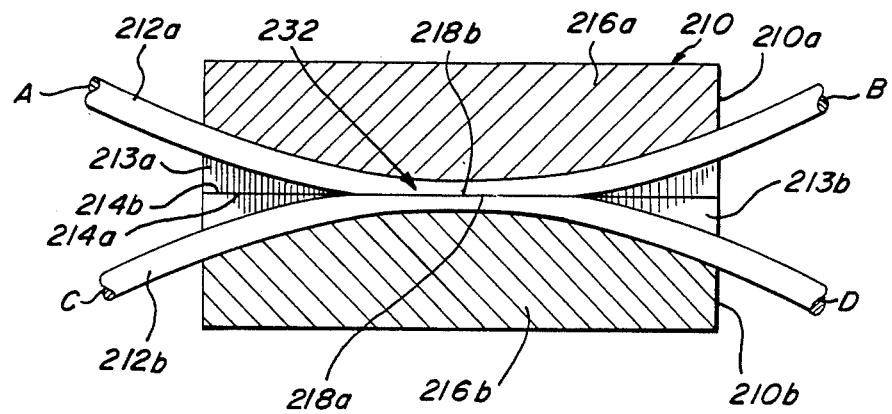
FIG. 4 is a cross-sectional view of the fiber optic coupler preferably used as a multiplexer in the present invention, showing a pair of fiber optic strands mounted in respective arcuate grooves with a given radius of curvature, mechanically polished and positioned to provide coupling between the two fiber optic strands.

Reference is made to FIG. 4, which illustrates a polished cladding multiplexer. A coupler 210, made of two coupler halves 210a and 210b includes two strands 212a and 212b of a fiber optic material, preferably single-mode fibers, mounted in longitudinal arcuate grooves 213a and 213b, respectively, formed in optically flat confronting surfaces 214a and 214b, respectively, of rectangular bases or blocks 216a and 216b, respectively.

Each of the strands 212a, 212b comprise an optical fiber which is doped to have a central core and an outer cladding. The strands typically have a core diameter on the order of 5 microns and a cladding diameter on the order of 125 microns.

The arcuate grooves 213a and 213b have a radius of curvature which is very large compared to the diameter of the fibers 212, and have a width slightly larger than the fibers 212, when mounted therein, to conform to a path defined by the bottom walls of the grooves 213. The depth of the grooves 213a and 213b varies from a minimum at the center of the blocks 216a and 216b, respectively, to a maximum at the edges of the blocks 216a and 216b, respectively. This advantageously permits the fiber optic strands 212a and 212b, when mounted in the grooves 213a and 213b, respectively, to gradually converge toward the center and diverge toward the edges of the blocks 216a, 216b, thereby eliminating any sharp bends or abrupt changes in direction of the fibers 212 which may cause power loss through mode perturbation.

Fiber optic material was removed from each of the strands 212a and 212b, e.g., by polishing, to form the respective oval-shaped planar surfaces 218a, 218b, which are coplanar with the confronting surfaces 214a, 214b, respectively. Thus, the amount of fiber optic material removed increases gradually from zero towards the edges of the blocks 216 to a maximum towards the center of the blocks 216. This tapered removal of the fiber optic material enables the fiber cores to converge and diverge gradually, which is advantageous for avoiding backward reflection and excess loss of light energy.

In the embodiment shown, the coupler halves 210a and 210b are identical and are assembled by placing the confronting surfaces 214a and 214b of the blocks 216a and 216b together, so that the confronting surfaces 214a and 214b of the strands 212a and 212b are in facing relationship.

An index matching substance (not shown), such as index matching oil, is provided between the confronting surfaces 214 in a thin film form.

An interaction region 232 is formed at the junction of the strands 212, in which light is transferred between the strands by evanescent field coupling. It has been found that, to ensure proper evanescent field coupling, the amount of materials removed from the fibers 212 must be carefully controlled so that the spacing between the core portions of the strands 212 is within a predetermined "critical zone." The evanescent fields extend into the cladding and decrease rapidly with distance outside their respective cores. The blocks or bases 216 may be fabricated of any suitable rigid material.

Tests have shown that evanescent wave polished couplers can have a coupling efficiency of up to 100%. However, it has also been observed that these couplers may be "tuned" to adjust the coupling efficiency to any desired value between zero and the maximum. Such tuning may be accomplished, e.g., by relatively laterally sliding the fibers in a direction perpendicular to their length. The relative positions of the fibers may be defined in terms of their offset, i.e., the distance between the central axes of the fiber cores, measured in the direction perpendicular to their length, along the confronting surfaces. Thus, referring to FIG. 4 again, when the oval surfaces 218 are superimposed, the offset is zero, and the offset increases as the fibers 212 are laterally separated by relatively sliding the blocks 216.

The coupler 210 illustrated in FIG. 4 is highly directional, with substantially all of the power applied at one side of the coupler being delivered to the other side of the coupler. The coupler directivity is defined as the ratio of the power at port D to the power at port C, with the input applied to port A. Further, the coupler directivity is symmetrical for a given mode of propagation. That is, the coupler operates with the same characteristics regardless of which side of the coupler is the input side and which side is the output side. Moreover, the coupler 210 achieves these results with very low throughput losses.

The coupler 210 operates on evanescent field coupling principles in which guided modes of the strands 212 interact, through their evanescent fields, to cause light to be transferred between the strands 212. As previously indicated, this transfer of light occurs at the interaction region 232. The amount of light transferred is dependent upon the proximity and orientation of the cores, as well as the effective length of the interaction region 232. As will be described in detail below, the amount of light transferred is also dependent on the wavelength of the light. The length of the interaction region 232 is, in turn, dependent upon the radius of curvature of the fibers 212, and to a limited extent, the core spacing, although it has been found that the effective length of the interaction region 232 is substantially independent of the core spacing. However, the "coupling length," i.e., the length within the interaction region 232 which is required for a single, complete transfer of a light signal from one fiber 212a to the other 212b, is a function of the core spacing as well as of the wavelength. However, if the length of the interaction region 232 is increased, or the core spacing decreased, a phenomenon referred to herein as "overcoupling" will occur, since the coupling length is shorter than the effective interaction length. Under these circumstances, the light will transfer back to the strand from which it originated. As the interaction length is further increased and/or the core spacing further decreased, the effective interaction length increases relative to the coupling length, and at least some of the light transfers back to the other strand. Thus, the light may make multiple transfers back and forth the two strands 212 as it travels through the region 232, the number of such transfers being dependent on the length of the interaction region 232, the light wavelength (as described below) and the core spacing.

Since the coupling length in a fiber coupler, typically a monomode fiber as described above, shows a strong dependence on signal wavelength, as described in detail in the aforementioned patents incorporated above, it is possible with properly chosen geometrical parameters for the coupler 210, to totally couple one signal wavelength while a second signal wavelength remains essentially uncoupled. This phenomenon permits the separation of two signals fed into the ports on two sides of the coupler 210. Thus, as shown in FIG. 4, if a pumping signal having a wavelength $\lambda_1$ is fed into port A of coupler 210, and a superfluorescent signal having a wavelength $\lambda_2$ is coupled to port B, and the geometry is properly selected, both signals can be separated such that the superfluorescent signal is entirely coupled from port B to port C, whereas the pumping signal undergoes no coupling from port A to port B.

Figure 5:
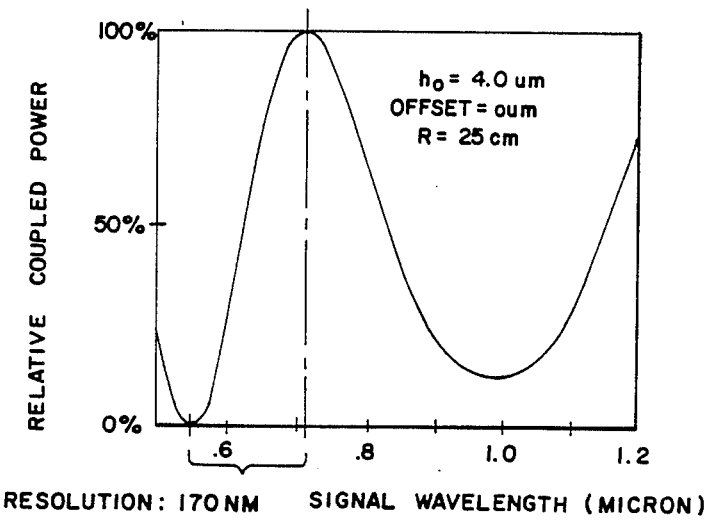
FIG. 5 is a diagram showing the relative coupled power versus signal wavelength for a fiber coupler, such as the coupler illustrated in FIG. 4, for selected values of the minimum fiber spacing and of the offset and for a fiber radius of curvature of 25 cm.

To illustrate this wavelength dependence, FIG. 5 provides a plot of coupled power versus signal wavelength in the visible and near infrared spectrum for a particular coupler geometry. Because for this coupler configuration the effective interaction length of the coupler is an odd multiple of the coupling length for the selected wavelength 720 mm, but an even multiple of the coupling length for the selected wavelength 550 nm, the wavelength 720 nm will be 100% coupled, while the wavelength 550 nm will be effectively uncoupled. With different efficiencies, different wavelengths may be combined or separated. For instance, 590 nm and 650 nm may be separated or combined at an 80% efficiency.

Virtually any pair of wavelengths ($\lambda_1$, $\lambda_2$) may be efficiently combined or separated so long as the effective interaction length is an even multiple of the coupling length for one wavelength and an odd multiple for coupling length for the other wavelength. As the number of coupling lengths within the effective interaction length increases, the resolution of the multiplexer is enhanced by increasing the radius of curvature of the fibers 212a, 212b. Provided that the interaction length of the coupler is large enough, virtually any two signals may be exactly mixed or separated, regardless of how closely spaced their wavelengths are.

Figure 6:
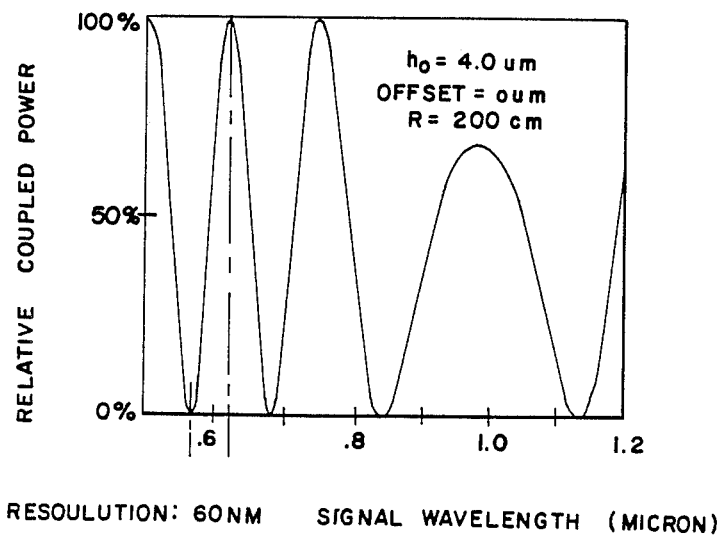
FIG. 6 is a diagram of relative coupled power versus signal wavelength similar to FIG. 5 for a fiber coupler having a fiber radius of curvature of 200 cm.

The interaction length is a function of wavelength, and the resolution is approximately proportional to $(R)^{-\frac{1}{2}}$, where R is the radius of curvature of the strands 212. As R increases, the effective interaction length increases, and becomes a higher multiple of the coupling length, improving resolution. This result is illustrated in FIG. 6, which is comparable to the graph of FIG. 5, except that the radius of curvature has been increased to 200 centimeters. As anticipated, this increase in radius improves the coupler resolution near $\lambda = 600$ nm from approximately 170 nm in the 25 centimeter radius example of FIG. 5 to approximately 60 nm in the 200 centimeter case.

The resolution of a multiplexing coupler depends on two independent parameters, H (fiber spacing) and R (radius of curvature of the fibers). For a given pair of signal wavelengths, efficient mixing may be achieved by first properly selecting a fiber spacing H for the coupler which yields a large wavelength dependence for the wavelengths of interest (choice of H) and then be selecting a radius of curvature which yields a resolution equal to the difference between the wavelengths (choice of R).

After the resolution of the coupler has been set in accordance with the wavelengths to be separated, the coupler may be tuned to precisely adjust the coupling lengths for the wavelengths of interest so that the effective interaction length is an even multiple of the coupling length of one wavelength and an odd multiple of the coupling length of the other wavelength. This is accomplished by offsetting the fibers by sliding the blocks 216a, 216b (FIG. 4) relative one another in a direction normal to the axis of the fibers 212a, 212b. Such an offset has the effect of increasing the minimum fiber spacing H and increasing the effective radius of curvature of the fibers. If the required offset is small enough, it will not upset the multiplexer resolution. This stems from the fact that the separation H of a large radius coupler changes rapidly with fiber offset in comparison to changes in the effective radius of curvature with fiber offset.

Figure 7:
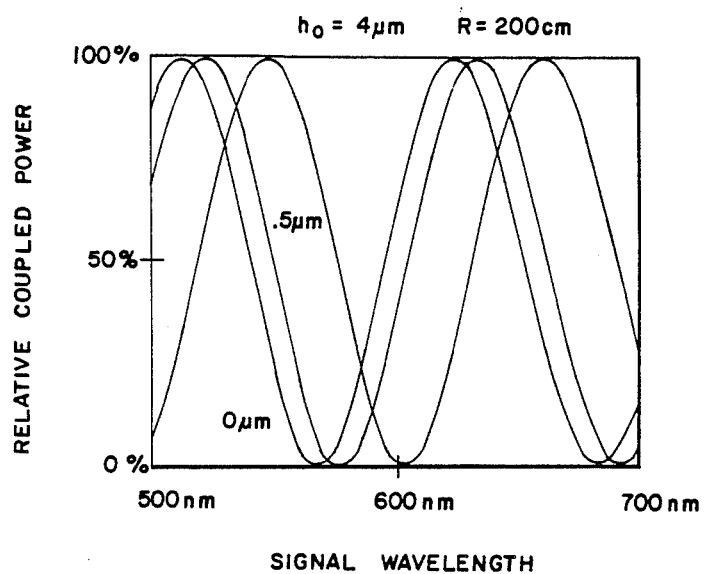
FIG. 7 is a diagram of relative coupled power versus signal wavelength for a fiber coupler having a minimum fiber spacing of 4 microns, a fiber radius of 200 cm and a different value of the fiber offset.

To illustrate this tunability of multiplexing couplers, FIG. 7 provides a plot of relative coupled power versus wavelength for three increasing values of fiber offset (0 microns, 0.5 microns and 1.0 microns). The curve is seen to shift toward increasing wavelengths as the offset increases, while the period of oscillation (or resolution) remains virtually unchanged. In this particular example (R=200 cm, H=4 microns), a 1-micron offset shifts the curve by approximately 45 nm.

In the preferred embodiment of the present invention using a laser source emitting at 820 nm and a superfluorescent doped fiber emitting at 1060 nm, the selective coupling is accomplished in accordance with the technique described above, by properly selecting the fiber spacing H to yield a large wavelength dependence for wavelengths between 0.8 microns and 1.06 microns, and then by selecting a radius of curvature for the fibers which yields a resolution equal to the difference between 1.06 and 0.8 microns, or 0.26 microns. After the resolution of the coupler has been set in this manner, the coupler may be tuned as previously described to adjust the coupling length for the wavelengths 0.8 micron and 1.06 microns so that the effective interaction length is an even multiple of the coupling length for one of this pair of wavelengths and an odd multiple of the coupling length for the remaining wavelength.

In the embodiment shown in FIG. 3, since it is desired to couple the output of the doped fiber into the fiber 106, the effective interaction length for the coupler should be adjusted to be an odd multiple of the coupling length of the wavelength of the doped fiber, 1.06 microns and to be an even multiple of the source light frequency, 0.8 micron. This will result in a complete coupling of the laser light coming from the doped fiber from the fiber 102 into the fiber 106, with essentially no coupling of the source illumination signal to be transmitted from the fiber 102 to the fiber 106. It will be understood, of course, that no coupling in this instance means an even number of complete couplings so that, for example, if the effective interaction length at the interaction region 232. is twice the coupling length at 1.06 microns, the laser output will be coupled two complete times, one from the fiber 102 to the fiber 106, and then from the fiber 106 to the fiber 102. Although adjustable couplers were used experimentally in embodying the present invention, it will be apparent to a person skilled in the art that other couplers can be used. Adjustable couplers are advantageous inasmuch as they can be readily "tuned" although the index-matching oil used at the interface of the two blocks of an adjustable coupler is prone to thermal dilatation. In many applications, fused couplers may be preferable to adjustable couplers as they are less sensitive to temperature.

Referring again to FIG. 3, if a signal is present in the lowermost fiber 106, the optical system of the present invention may operate as an amplifier, in accordance with the teachings disclosed in the parent application, U.S. Pat. No. 4,674,830. The signal to be amplified is selected to have a wavelength at the laser transition wavelength, 1.064 microns, i.e., the wavelength of light emitted by the Nd ions during relaxation between the upper and lower lasing levels. When the signal to be amplified is injected into the lowermost finer 106 and supplied to the doped fiber 108 by the coupler 104, it will trigger the emission of stimulated photons at the same frequency as the signal, coherent with the signal, and will be thereby amplified. Thus, the passage of light at this frequency will cause a photon-emitting relaxation between the upper lasing level and lower lasing level as shown in FIGS. 1a and 1b, in phase with the light signal to be amplified, yielding an effective gain for the input light signal. The optical system of the present invention thus functions as an amplifier. In this particular configuration, there is no reflector placed at the end of the lowermost fiber 106. are selected so that the signal can be transmitted through The amplifier signal is output at the end 120 of the doped fiber 108.

Figure 8:
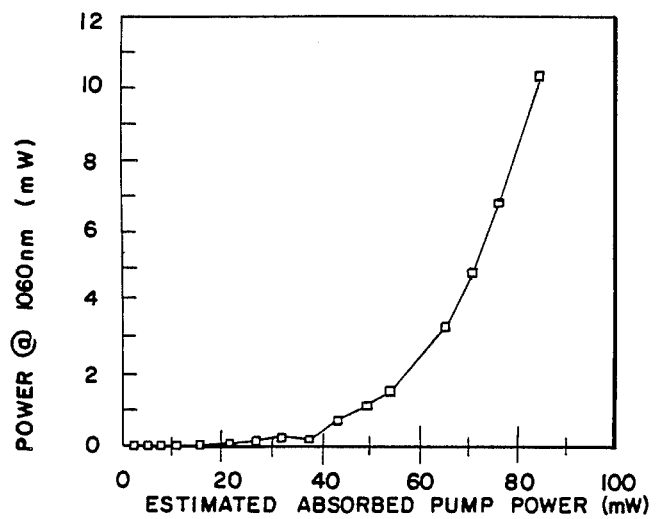
FIG. 8 is a diagram showing the output of the superluminescent source of the present invention versus the input pump power.

Reference is now made to FIG. 8 which represents a graph of the output power versus estimated absorbed pump power for a superfluorescent source as disclosed in connection with the description of FIG. 3. The fiber output is essentially unpolarized. At 10 mW output power, the conversion slope efficiency is 45% with a net conversion efficiency between the absorbed pump power and the 1060 nm signal of 12%. For low pump power, the output power increases linearly with pump power due to additive spontaneous emission. As stimulated emission becomes significant, the output increases nonlinearly essentially as $e^{2G}$, where G is the line center gain experienced by a signal which has travelled the whole length of the device. Placing the mirror 118 at one end of the fiber 106 effectively doubles the active length and, barring any saturation effects, doubles the gain. It should be noted that this is a very large effect as the output now increases as $e^{2G}$. The output power drops to about 300 μW for 80 mW absorbed pump when the mirror 118 is removed.

Figure 9:
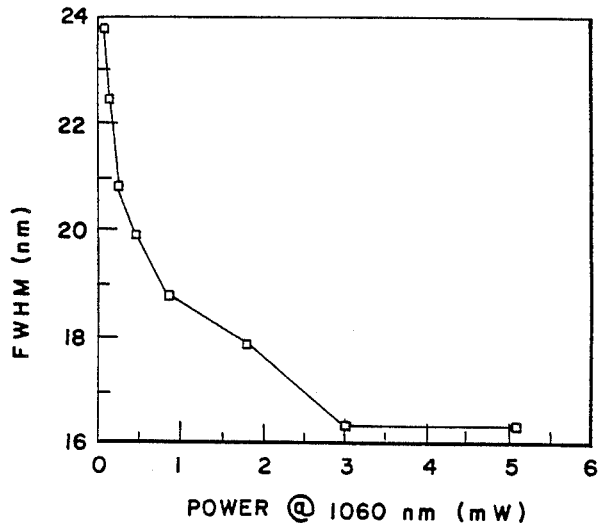
FIG. 9 is a diagram showing the full width at half maximum of the superluminescent source spectrum of the present invention as a function of the output power with a pump wavelength at 825 nm.
Figure 10:
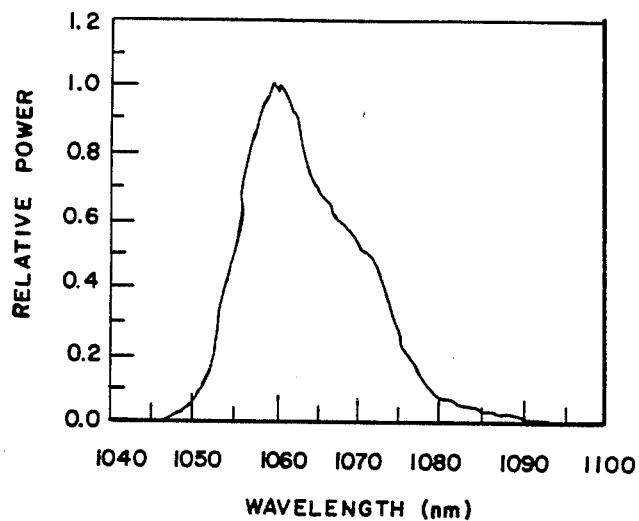
FIG. 10 is the spectrum of the 1060 nm line of the superluminescent source of the present invention with total power of 4.8 mW for a pump wavelength at 825 nm.

Reference is now made to FIG. 9, which shows how the measured linewidth narrows asymptotically due to greater amplification at the peak of the output spectrum and becomes nearly constant at about 16 nm for total output power in the mW range. In FIG. 9, the pump wavelength is selected to be 825 nm. FIG. 10 shows a typical output spectrum of the 1060 nm line with 4.8 mW total power for a pump wavelength of 825 nm.

Figure 11A:
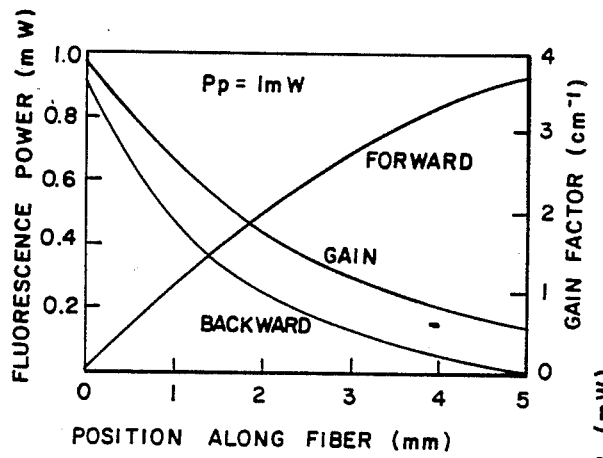
FIGS. 11a, 11b and 11c show the evolution of the gain factor and the total fluorescent power along the length of a lossless single-mode superfluorescent doped fiber used in the preferred embodiment of the present invention.
Figure 11B:
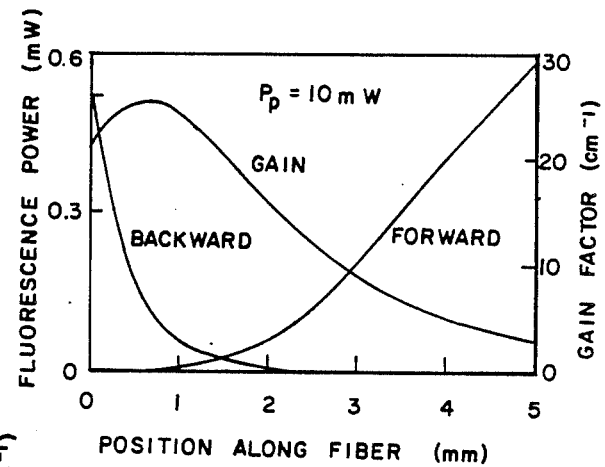
Figure 11C:
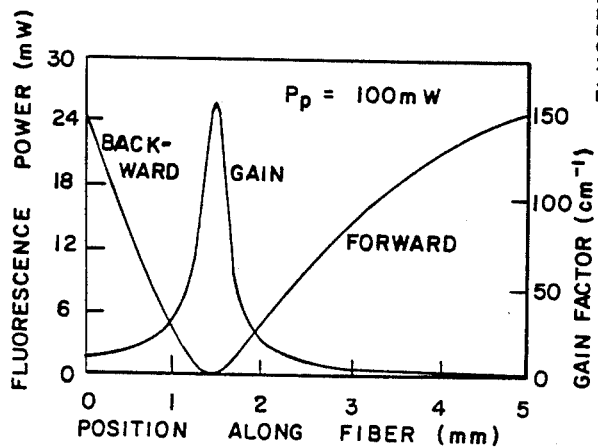

Referring now to FIGS. 11a, 11b and 11c, there is illustrated the evolution of the gain factor and total fluorescence power along the length of a preferred embodiment of the present invention using a 1% Nd-doped YAG superfluorescent doped fiber. The material parameters are such as $\sigma_s = 3.2 \cdot 10^{-19}$ cm$^2$, $\tau_f = 230$ μs and $n_1 = 1.820$, where $\sigma_s$ is the simulated cross section at line center, $\tau_f$ is the fluorescence lifetime of the material and $n_1$ is the more index of the doped fiber. The pump wavelength source is assumed to be $\lambda_p = 810$ nm and the material absorption coefficient $\sigma_a$ approximately 4 cm$^{-1}$. FIG. 11a shows that at low pump power levels, spontaneous emission dominates and the forward and backward waves P+ and P− build up almost linearly. The gain factor is essentially unsaturated and decays exponentially from left (input side) to right as a result of pump absorption. At high pump power (FIG. 11b), stimulated emission is dominant and the fluorescence power grows exponentially At high enough pump power, the fluorescence grows to very large levels near the input and output ends of the fiber, where the gain factor is strongly reduced by population inversion depletion (FIG. 11c). The gain factor exhibits a sharp maximum near the center of the fiber where the total fluorescence power, which is the sum of the power of the forward signal P+ and of the power of the backward signal P−, is minimum.

DESCRIPTION OF THE SECOND EMBODIMENT

It will be recognized that the results achieved in the present invention may also be realized using a coupler in which the coupling efficiency at the pumping illumination wavelength is 100%, while the coupling efficiency at the laser output wavelength is 0%.

Figure 12:
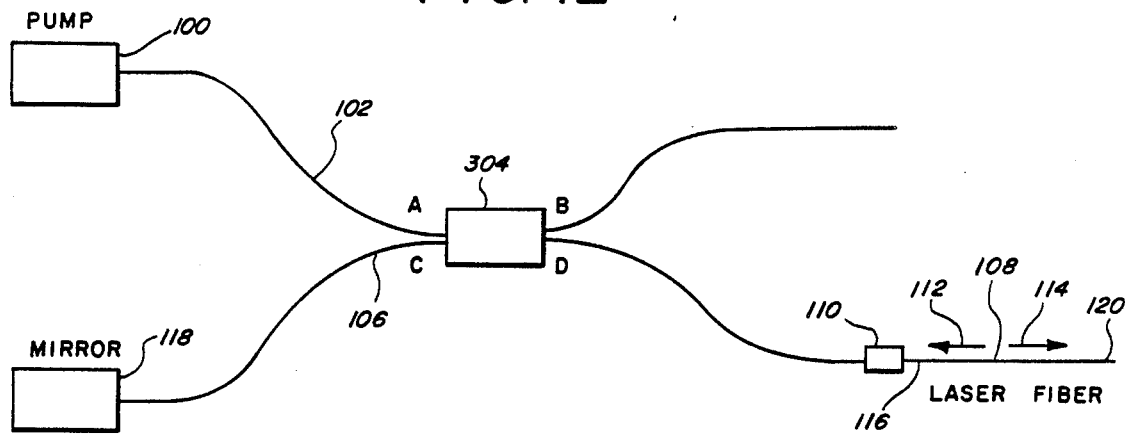
FIG. 12 is a schematic diagram showing a second preferred embodiment of the present invention.

FIG. 12 is an illustration of such an embodiment. In this embodiment, the pump source and the mirror are coupled to the coupler similarly to the first embodiment described hereabove in connection with FIG. 3. As FIG. 12 incorporates the same elements described in connection with FIG. 3, the same numerals used in FIG. 3 will be used in FIG. 12 to designate the same elements The multiplexing coupler of FIG. 12, however, has characteristics different from the coupler 104 of FIG. 3, and will be designated by the numeral 304. The pump source 100 therefore provides pumping illumination at port A of a multiplexing coupler 304 via a fiber 102, whereas a mirror 118 is coupled to one end of a fiber 106 at port C. A doped fiber 108 is coupled at port D in the manner explained in connection with the description of FIG. 3. The doped fiber 108 is preferably coupled to the optical fiber by means of a splice 110 or may simply be fused to that optical fiber 106. Port B is preferably left uncoupled.

In this embodiment, the coupler 304 is adjusted to substantially have a 100% coupling efficiency at the wavelength of the pumping source and a 0% coupling efficiency at the wavelength of the light signal emitted by the doped fiber 108.

The light from the pumping source 100 is first transmitted along the fiber 102, and coupled from port A to port D into the doped fiber 108. The doped fiber, preferably an Nd:silica fiber, emits a superfluorescent signal in both the backward and the forward directions as indicated by the arrows 112 and 114 in FIG. 22. The forward signal 114 is output, uncoupled, to the output end 120 of the doped fiber 108. The backward signal 112, however, is injected back into the coupler 304 at port D and is transmitted to the fiber 106, after being coupled an even number of times through the coupling function of the coupler 304. The backward signal 112 is therefore transmitted from port D to port C and is injected into the optical fiber 106 to which is attached to the mirror 118. The backward output 112 is therefore reflected back to the coupler 304 through the action of the mirror 118 and transmitted to port D of the coupler 304. The backward signal 112 after reflection on the mirror is finally output to the output end 120 of the doped fiber 108.

OPERATIVE MODES OF FIRST AND SECOND EMBODIMENTS

A person skilled in the art will recognize that the embodiments illustrated hereabove both function according to the same principles. One major advantage over the prior art resides in the fact that the pumping illumination is directly launched into the doped fiber without traversing the mirror as was performed heretofore in the prior art. In the embodiments of the present invention, the pumping illumination injected into the optic fiber 102 is subsequently coupled through coupling function of the coupler 104 (304) either to port B or to port D depending upon the selected embodiment. The pumping signal is never transmitted to the adjacent optic fiber 106 and the mirror 118. It will be apparent to a person skilled in the art that in the present invention, the pump coupling efficiency is substantially increased. This is particularly advantageous as pump power is critical in generating superfluorescence in the doped fiber.

The use of the mirror 118 to reflect the superfluorescent signal greatly increases the total gain of the fiber and permits to reduce the power of the pumping source. By means of a specific example, for a doped fiber with a gain of approximately 0.3 dB/mW, a laser source of output approximately 60-70 mW is typically necessary to obtain a total gain of 9 dB. In the device of the present invention, the double passage of the pumping signal by means of the reflector 118 dramatically reduces the required source power by a factor of 2 as a laser source of 30-35 mW is sufficient to obtain the same gain of 9 dB. The aforementioned embodiments of the present invention also greatly simplify the coupling process as well as the requirements pertaining to the operation of the mirror. In the device of the present invention, the mirror is preferably a high reflector and need not be selected in accordance with other criteria such as its multiplexing properties. Furthermore, in the preferred embodiments of the present invention, the pump signal need not traverse a mirror before launching into the doped fiber. Various coupling methods can therefore be envisaged to improve the coupling efficiency. This is particularly true for pump sources such as laser diodes whose coupling efficiency is generally low. In the preferred embodiments of the present invention, such efficiency, even with pumping sources such as laser diodes, is greatly improved. Coupling techniques well known in the art are therefore applicable to the devices of the present invention. These coupling techniques include, inter alia, tapering the extremity of the fiber at port A. Tapered fibers are generally used to channel light from a source or a fiber of comparatively large cross section into a fiber of smaller cross section. By drawing a fiber such that one end thereof has a larger cross section than the other end, it is possible to efficiently couple light emitted by a light source into an optical fiber. Integrated microlenses on the fiber end can also be advantageously used. It is well known in the art that those coupling techniques also improve the frequency stability of the system and more generally ameliorate the performance thereof. A thorough discussion of tapered fibers may be found in *Optical Waveguide Theory* by Allan Snyder and John Love, Chapman and Hall, 183, London, Great Britain, pp. 107–112.

In the present invention, mode-matching is also optimized and is substantially better than with regular optical components such as lenses. By butting the fiber directly to the doped fiber, the device thus obtained according to the present invention is very robust, compact and less prone to failure or susceptible to damage during transportation, for example. Another major progress over the prior art offered by the aforementioned embodiments of the present invention resides in the particularly advantageous design which permits a separation of the source signal and of the laser signal. In devices of the prior art, both the source signal and the laser output travel along the same optical waveguides. It is preferable that the laser light does not return to the pump source nor the coupling optics as such signal propagating towards the cavity of the pumping source may create feedback on the signal path. In the preferred embodiments of the present invention, the output laser signal is coupled to the mirror via the coupler either after a 100% transmission through the coupler (first embodiment illustrated in FIG. 3) or after a 0% transmission through the coupler (second embodiment illustrated in FIG. 12). The laser signal therefore does not "see" the cavity of the pump source or the coupling optics, which results in reduced feedback into the signal path emerging from the pump source. This is a substantial advantage of the invention over prior art devices which did not maintain the laser signal spectrum free of undesirable structure-induced resonance effects. The coupler thus acts as an isolator by preventing the laser output signal to propagate back to the cavity of the pump source.

Another and critical advantage of the present invention results from the substantial improvement in the temperature dependence of the superfluorescent source due to the filtering effect produced by the coupler.

The coupler 104 or 304 in the preferred embodiments respectively illustrated in FIGS. 3 and 12 advantageously perform at least two important functions. It first acts as a multiplexer insofar as it provides specific routes to the signals propagating therethrough in accordance with the frequencies of these signals. This multiplexing function has been described hereabove in connection with the description of FIGS. 3 and 12. Furthermore, the coupler used in the present invention is advantageously used to stabilize the superfluorescent signal emitted by the doped fiber 108 against temperature changes.

Figure 13B:
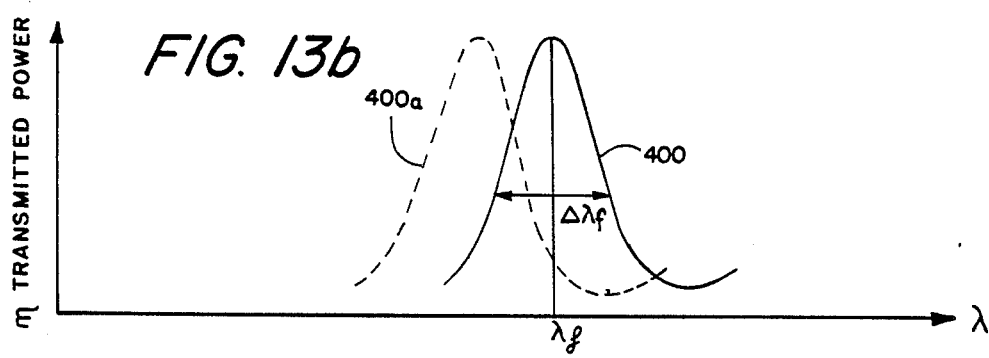
FIGS. 13a and 13b are diagrams respectively showing the temperature dependence of the filter function of the coupler used in the preferred embodiments of the present invention and the temperature dependence of a fiber source spectrum in accordance with the present invention.
Figure 13A:
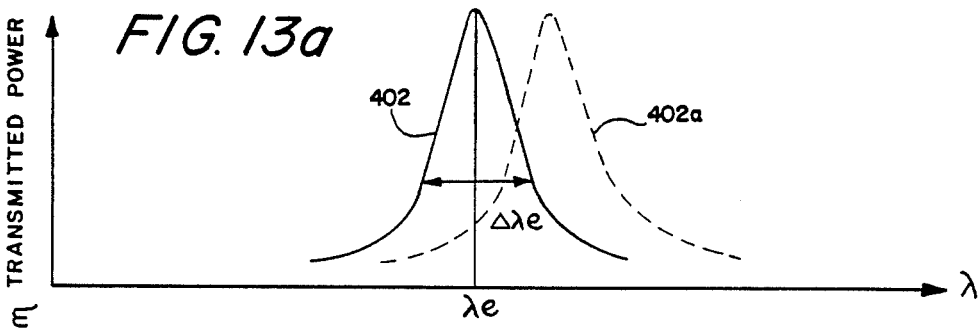

A coupler is typically characterized by a filter function which depends on the structural configuration of the coupler. Some filter functions representing a coupler power versus signal wavelength were described hereabove in connection with FIGS. 5, 6 and 7. In order to gain a better understanding of the frequency stability achieved by the filtering functions of the frequency stability achieved by the filtering functions of the coupler and the temperature dependence of the coupler, reference is now made to FIG. 13a which is a diagram illustrating the temperature dependence of a given coupler function. The coupler wavelength dependence function is plotted in FIG. 13a using the power transmitted through the coupler $\eta$ as the ordinate and the wavelength $\lambda$ as the abscissa Theoretical calculations and experimental data indicate that an increase temperature translates the filtering function represented by the curve 400 in the direction of the lower wavelengths, therefore onto the left-hand side of FIG. 13, thereby yielding a new curve 400a for a higher temperature. Theoretical calculations also show that the horizontal displacements of the curve 400 in FIG. 13a are substantially independent of the full width at half maximum (FWHM) of the coupler. The following formula has been proposed to describe the temperature dependence of the filter function for all-glass fiber optic couplers:

$$\frac{\partial \lambda_f}{\partial T} = -\lambda_f (\alpha + \rho) \qquad (1)$$

wherein $\lambda_f$ is a wavelength of the filter function around the center wavelength, T the absolute temperature, $\alpha$ is the expansion coefficient and $\rho$ is the thermo-optic coefficient of the coupler. Details on those theoretical calculations can be found in an article by G. Meltz, et al., entitled "Cross-Talk Fiber-Optic Temperature Sensor," *Applied Optics*, Vol. 22, No. 3, Feb. 1, 1983. This article is hereby incorporated by reference.

The coefficient $(\alpha+\rho)$ is quasi-independent of the glass type and has a value in the order of $10^{-5}/°C$. for all-glass couplers. Thus, typically, the quantity $1/\lambda_f \cdot \partial \lambda_f / \partial T$ is about $-10$ ppm/°C. for an all-glass coupler In adjustable fiber couplers, however, wherein a liquid layer is inserted at the interface formed by the cores of the coupled fibers, the thermo-optic coefficient of the coupler is higher. Temperature dependence in the order of several hundreds of ppm/°C. is not uncommon in polished fiber couplers. More details on the temperature dependence of adjustable polished couplers can be found in Michael Digonnet, et al., "Analysis of a Tunable Single Mode Optical Fiber Coupler," *IEEE Journal of Quantum Electronics*, Vol. QE-18, No. 4, April 1982, pp. 746–754, and in M. Digonnet, et al., "Wavelength Multiplexing in Single-Mode Fiber Couplers," *Applied Optics* Vol. No. 22, No. 3, Feb. 1, 1983, pp. 484–491.

As to the filter linewidth of the coupler, it may vary from a few angströms (narrow filter) to several hundreds of nanometers (200 nm or so) depending on the fiber selected and the radius of curvature of the fiber. The full-width at half maximum (FWHM) is typically represented by $\Delta\lambda_f$ and is the line width of the filter function at half the maximum of power transmitted. $\Delta\lambda_f$ is indicated in FIG. 13a.

On the other hand, the wavelength of the superfluorescent signal emitted by the fiber source is also dependent upon temperature. Those skilled in the art will recognize that all fiber sources, including resonant and non-resonant sources, exhibit an intrinsic wavelength dependence of their emission wavelength $\lambda$ with respect to temperature characterized by the coefficient $\delta\lambda_p/\delta T$. Reference is now made to FIG. 13b which illustrates the temperature dependence of the emission spectrum of a superfluorescent fiber source in accordance with the present invention. In FIG. 13b, the emission spectrum is represented by the curve 402. Temperature affects this spectrum by translating it towards the right-hand side so as to yield curve 402a. Typically, the temperature dependence of a fiber source is in the order of a few ppm per °C. (10–20 ppm/°C.).

The full-width at half maximum (FWHM) of a fiber source, $\Delta\lambda_p$, may typically vary from sub-nanometers to a few tens of nanometers. However, for most optical applications, including fiber gyroscopes, a FWHM in the order of 20–30 nm is preferable in practice.

One of the advantages of the present invention is to advantageously use a coupler with selected temperature dependence characteristics so as to at least partially cancel the temperature drift of the emission spectrum FIG. 13b shows that the emission spectrum of the fiber source is translated towards the higher wavelengths with a temperature increase; simultaneously, the same temperature increase displaces the multiplexing curve of the coupler towards the lower wavelengths.

When light emitted by the source with a given spectrum is filtered by a coupler with a given filter function, the intensity of the filtered light is simply the product of the spectrum function by the filter function for a particular wavelength. The spectrum of the filtered light is therefore given by the following equation:

$$P_{filtered}(\lambda) = P_{source}(\lambda) \cdot P_{coupler}(\lambda) \quad (2)$$

where $P_{filtered}$ is the total output signal power, $P_{source}$ is the power of the source signal before coupling the $P_{coupler}$ transmitted by the coupler for a given wavelength.

By appropriately selecting the variation of wavelength with respect to temperature of the coupler used in the device of the present invention, it is possible to cancel or at least minimize the temperature drift of the fiber source emission spectrum.

For numerous applications, comprising gyroscope applications, the person skilled in the art will recognize that the quantity in the emission spectrum which should be made stable with respect to temperature is the average spectrum wavelength $<\lambda>$, rather than the center wavelength $\lambda_p$ of the spectrum.

This average spectrum wavelength $<\lambda>$ is defined by the following expression for a signal emitted by a source and filtered by a multiplexing coupler.

$$<\lambda> = \frac{\int_{spectrum} \lambda\, P(\lambda)\, F(\lambda)\, d\lambda}{\int_{spectrum} P(\lambda)\, F(\lambda)\, d\lambda} \quad (3)$$

wherein $P(\lambda)$ is the emission spectrum function of the source and $F(\lambda)$ is the filter function of the coupler. The subscript "spectrum" appearing under the integral sign $\int$ refers to the fact that the integrations are performed for the values $\lambda$ of the emission spectrum.

Theoretical calculations have yielded the following results summarized in Table 1 and in Table 2 below:

TABLE 1

| $\Delta T$ °C. | $\delta\lambda_p/\Delta\lambda_p$ | $\delta\lambda_f/\Delta\lambda_f$ | Unfiltered ($\delta<\lambda>/\Delta\lambda_p$) | Filtered ($\delta<\lambda>/\Delta\lambda_p$) | Net Improv. |
|---|---|---|---|---|---|
| 180 | $5 \cdot 10^{-3}$ | $-2.05 \cdot 10^{-3}$ | $-1.8 \cdot 10^{-3}$ | $1.135 \cdot 10^{-8}$ | 52.0 dB |
| 144 | $4 \cdot 10^{-3}$ | $-1.64 \cdot 10^{-3}$ | $-1.45 \cdot 10^{-3}$ | $7.54 \cdot 10^{-9}$ | 52.8 dB |
| 108 | $3 \cdot 10^{-3}$ | $-6.1576 \cdot 10^{-3}$ | $-1.09 \cdot 10^{-3}$ | $4.76 \cdot 10^{-9}$ | 53.5 dB |
| 72 | $2 \cdot 10^{-3}$ | $-8.21 \cdot 10^{-4}$ | $-7.25 \cdot 10^{-4}$ | $2.74 \cdot 10^{-9}$ | 54.2 dB |
| 36 | $1 \cdot 10^{-3}$ | $-4.105 \cdot 10^{-4}$ | $-3.63 \cdot 10^{-4}$ | $1.24 \cdot 10^{-9}$ | 54.7 dB |
| 18 | $5 \cdot 10^{-4}$ | $-2.05 \cdot 10^{-4}$ | $-1.81 \cdot 10^{-4}$ | $6.06 \cdot 10^{-10}$ | 54.8 dB |
| 1.8 | $5 \cdot 10^{-5}$ | $-2.05 \cdot 10^{-5}$ | $-1.81 \cdot 10^{-5}$ | $6.00 \cdot 10^{-11}$ | 54.8 dB | with $\Delta\lambda_p = 0.7215$ and $\Delta\lambda_f = 2.0$.

TABLE 2

| $\Delta T$ °C. | $\delta\lambda_p/\Delta\lambda_p$ | $\delta\lambda_f/\Delta\lambda_f$ | Unfiltered ($\delta<\lambda>/\Delta\lambda_p$) | Filtered ($\delta<\lambda>/\Delta\lambda_p$) | Net Improv. |
|---|---|---|---|---|---|
| 108 | $3 \cdot 10^{-3}$ | $-1.913887 \cdot 10^{-3}$ | $-2.45 \times 10^{-3}$ | $6.61 \times 10^{-10}$ | 65.7 dB |
| 72 | $2 \cdot 10^{-3}$ | $-1.276 \cdot 10^{-3}$ | $-1.63 \times 10^{-3}$ | $-1.35 \times 10^{-8}$ | 50.8 dB |
| 36 | $1 \cdot 10^{-3}$ | $-6.38 \cdot 10^{-4}$ | $-8.16 \times 10^{-4}$ | $-1.095 \times 10^{-8}$ | 48.7 dB |
| 18 | $5 \cdot 10^{-4}$ | $-3.19 \cdot 10^{-4}$ | $-4.08 \times 10^{-4}$ | $5.99 \times 10^{-3}$ | 48.3 dB |
| 3.6 | $1 \cdot 10^{-4}$ | $-6.38 \cdot 10^{-5}$ | $-8.16 \times 10^{-5}$ | $1.23 \times 10^{-9}$ | 48.2 dB |
| 1.8 | $5 \cdot 10^{-5}$ | $-3.19 \cdot 10^{-5}$ | $-4.08 \times 10^{-5}$ | $-6.17 \times 10^{-10}$ | 48.2 dB | with $\Delta\lambda_p = 0.7215$ and $\Delta\lambda_f = 5.0$.

In the above tables, the variables defined therein are as follows:

$\Delta T$: variation in temperature in °C.;

$\Delta\lambda_p$: FWHM of the source;

$\Delta\lambda_f$: FWHM of the coupler;

$\delta\lambda_p/\Delta\lambda_p$: variation of the source emission spectrum center wavelength, normalized with respect to the FWHM of the source, due to the temperature change $\Delta T$;

$\delta\lambda_f/\Delta\lambda_f$: variation of the coupler function center wavelength, normalized with respect to the FWHM of the coupler, due to the temperature change $\Delta T$;

($\delta<\lambda>/\Delta\lambda_p$): (unfiltered): variation of the average spectrum wavelength $<\lambda>$ due to the temperature change $\Delta T$, without using a multiplexing coupler;

($\delta<\lambda>/\Delta\lambda_p$): (filtered): variation of the average spectrum wavelength $<\lambda>$ due to the temperature change $\Delta T$, using a multiplexing coupler.

The last column in Tables 1 and 2 indicates the net improvement obtained by using a coupler as disclosed in the present invention. Tables 1 and 2 respectively correspond to a narrow filter ($\Delta\lambda_f=2.0$) having a temperature dependence of the coupler $\delta\lambda_f/\delta T$ of about 11 ppm/°C. and a broader filter ($\Delta\lambda_f=5.0$) having a temperature dependence of the coupler $\delta\lambda_f/\delta T$ of about 88 ppm/°C. In the theoretical calculations whose results are summarized in Tables 1 and 2, various assumptions were made which do not limit the scope of the findings. Namely, the emission spectrum of the source is considered to be a Gaussian. Furthermore, the coupler function is approximated by a $\sin^2$ function, a hypothesis confirmed by both theoretical models and experimental data. The filter function of the coupler is also assumed not to comprise any sidebands. A filter having a function which satisfies these assumptions can be readily achieved by concatenating appropriate fiber couplers. Alternatively, suppression of sidebands can be obtained using a bulk optic filter. Although such a bulk optic filter has a large temperature dependence (typically in the order of 100 ppm or more per °C.), its effect is small as the bulk filter edges are selected to fall near zeroes of the coupler filter function A shift of the bulk optic filter function thus has little effect on the resulting filter transmission.

The results shown in Tables 1 and 2 clearly indicate a net improvement in the temperature dependence of the source when the source signal is preliminarily coupled by means of a multiplexing coupler. The net effect of the filter is therefore to reduce variations in the average spectrum wavelength caused by temperature by a factor of about 50 dB. The improvement in the temperature dependence of the laser signal is also appreciable in the case of a coupler having a larger temperature dependence (Table 2) and is also in the order of 50 dB.

Figure 14:
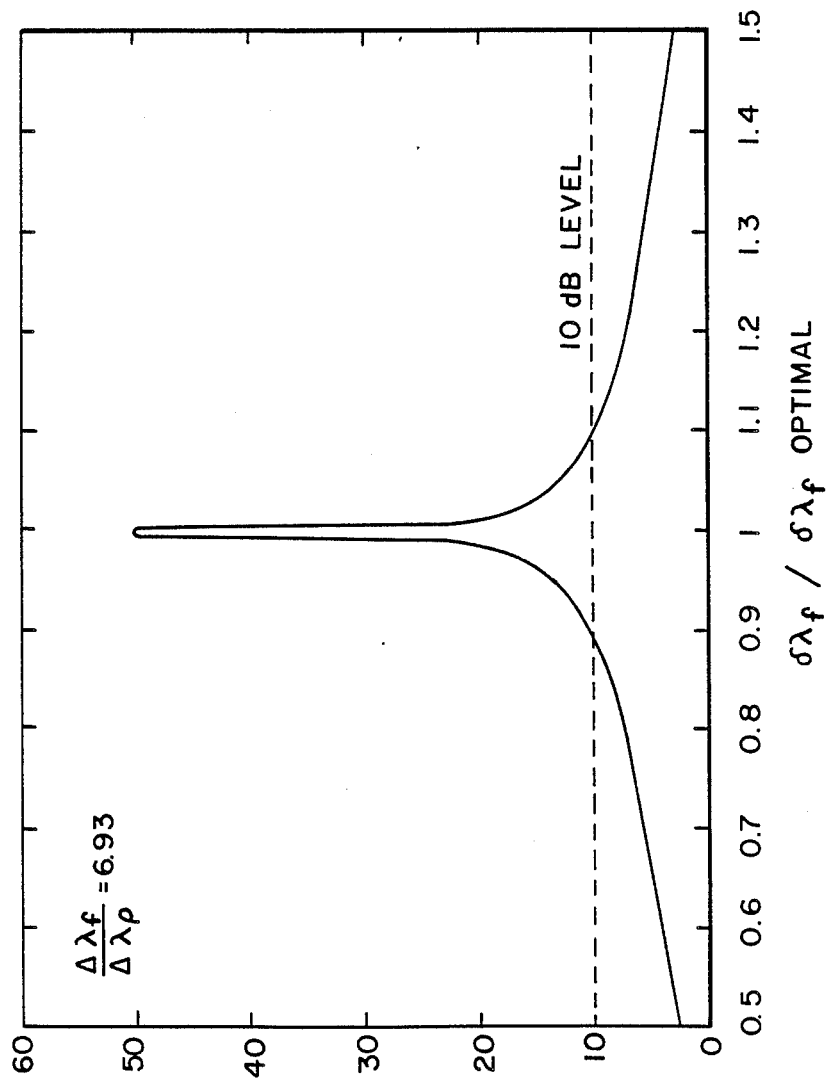
FIG. 14 is a diagram showing the net improvement in temperature stability of the average spectrum wavelength of the fiber source of the present invention as a function of the temperature dependence of the coupler used in connection with the fiber source of the present invention.

In the theoretical calculations described hereabove, the value $\delta\lambda_f$ is calculated to minimize the average spectrum wavelength $<\lambda>$ for a given specific temperature change. The net improvement in the temperature dependence of the source signal thus depends on the value chosen for $\delta\lambda_f$. Further calculations show that the improvement is reduced when $\delta\lambda_f$ is not exactly set at its optimal value. Reference is now made to FIG. 14 which is a diagram showing how the improvement varies with respect to the H value selected for $\delta\lambda_f$. The ratio $\delta\lambda_f/\delta\lambda_f$ (optimal) is represented on the abscissa axis whereas the improvement $\delta<\lambda>/\delta T$ in dB is represented on the ordinate axis. The person skilled in the art will recognize that the improvement of the temperature dependence of the source remains substantial (greater than 10 dB) as long as the value of $\delta\lambda_f$ is selected within 10% of its optimal value. By using a coupler in the device of the present invention and adequately selecting the temperature dependence of the coupler within 10% of its optimal value, it is possible to reduce the temperature dependence of the fiber source from a value of 10-20 ppm/°C. to 1-2 ppm/°C. or better. The above theoretical calculations have assumed that the temperature dependence of the coupler is linear. Taking into account the nonlinearity of couplers and assuming that the combined effects due to the selection of $\delta\lambda_f/\delta T$ and the nonlinearity of $\lambda_f(T)$ bring the value $\delta\lambda_f$ within only 30% of the original value of $\delta\lambda_{f(optimal)}$, FIG. 14 clearly shows that an improvement of a factor of 3 can still be obtained with the device of the present invention. The improvement in the temperature dependence of the source can be obtained in most of the relevant optical applications of the present invention, and in particular in gyroscopes.

The filtering effect of the coupler can be enhanced in the embodiments described hereabove insofar as at least one component of the source signal traverses the coupler twice. In such a case, the intensity of the filtered light is equal to the product of the intensity of the unfiltered light emitted by the source and by the square of the filter coefficient for a given wavelength. This is best summarized in the equation:

$$P_{filtered}(\lambda) = P_{source}(\lambda) \cdot P^2 coupler(\lambda) \qquad (4)$$

The device of the present invention is thus extremely advantageous over the prior art as it circumvents many limitations well recognized in the art. By properly selecting a coupler such that its temperature dependence varies in the opposite direction of the source spectrum, it is possible to effectively reduce the average wavelength temperature-induced shift of the source spectrum. A net improvement as high as 50 dB can be obtained if the temperature dependence of the coupler is properly selected. The improvement in the temperature dependence of the source remains however substantial (on the order of 10 dB) if the value of $\delta\lambda_f/\delta T$ is selected within 10% of its optimal value. The gain is still appreciable (about 3) when the values of $\delta\lambda_f/\delta T$ is selected within 30% of its optimal value. The value of $\delta\lambda_f/\delta T$ is fully compatible with optical couplers presently known.

It should also be noted that the above results remain valid when extended to other sources than superfluorescence fiber sources. In particular, the temperature dependence of the output of a resonant broadband fiber laser can also be dramatically reduced using a multiplexing coupler and appropriately selecting the value of $\delta\lambda_f/\delta T$. It should be understood that the above results are applicable to narrower band fiber laser sources as well.

Figure 15:
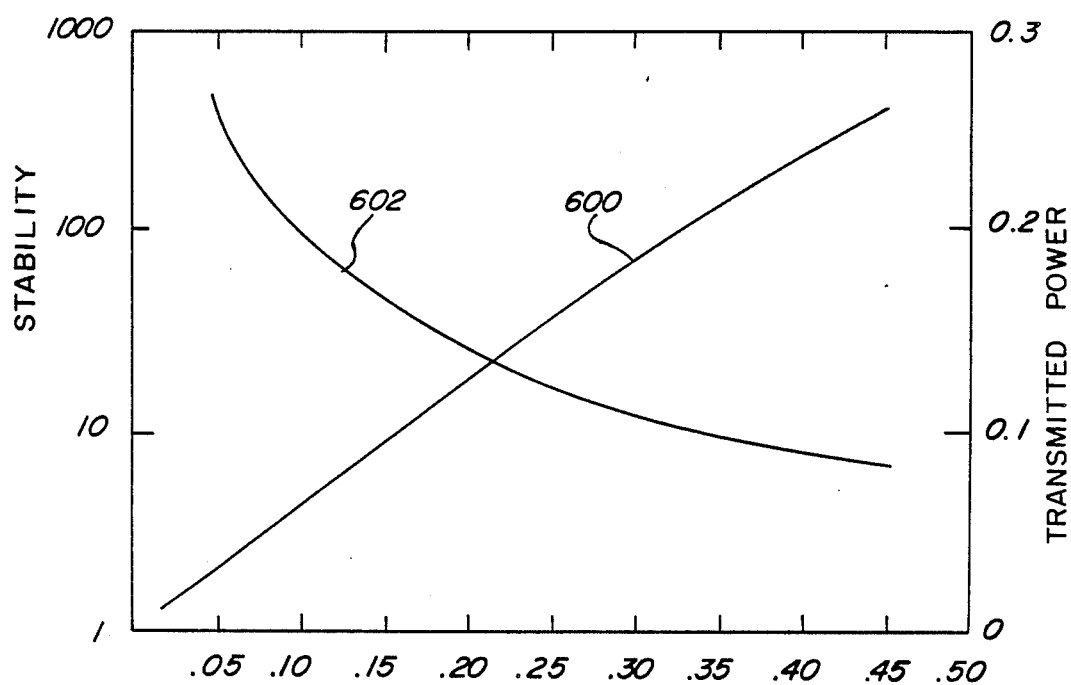
FIG. 15 is a diagram showing the stability as a function of the ratio of the full width at half maximum of the filter over the full width at half maximum of the fiber source, and the transmitted power as the function of this ratio.

Reference is now made to FIG. 15 which illustrates the dependence of the stability and of the transmitted power with respect to the ratio of the filter FWHM over the source FWHM. In this graph, the abscissa is represented by this ratio. On the leftmost ordinate axis, the stability of the superfluorescent output signal is represented whereas the rightmost axis shows the transmitted output power of the superfluorescent signal. For a better understanding of the criteria involved in selecting the filter, the filter whose characteristics are plotted in FIG. 15 is assumed to be infinitely stable with respect to temperature. The increase of output signal stability is by definition the mean wavelength stability for a fixed stable filter function (e.g., a $\cos^2$ function), over an unstable source (e.g., a Lorentzian source). The stability curve 600 clearly indicates that the stability of the output signal increases when the filter FWHM decreases for a given source FWHM. The output spectrum filtered by a narrower filter (small FWHM) is, therefore, less temperature dependent than the output spectrum filtered by a broader filter (large FWHM). However, the tradeoff for this increase of stability for narrow filtering functions is that less power is transmitted through the coupler, as designed by curve 602. The person skilled in the art will indeed recognize that the narrower a filtering function is, the less wavelengths are transmitted and, therefore, the less power is delivered through the coupler.

By properly selecting the coupler parameters, it is therefore possible to obtain a coupler filter function which considerably reduces the temperature dependence of the source spectrum. This filter function is however sufficiently transmissive so that the intensity of the output light is sufficiently high for the various applications in which this light is to be used. The value of 0.20 for the ratio filter FWHM over source FWHM seems to optimize the above requirements as indicated on the graph. This value corresponds to the intersection point of the two curves 600 and 602.

The configuration of optical elements described in connection with the preferred embodiments of the present invention is thus extremely advantageous insofar as the output light emitted by the superfluorescent source of the present invention is made less temperature dependent than the light of any superfluorescent source of the prior art.

The gain which can be achieved in the superfluorescent source of the present invention using an Nd doped fiber is dependent upon the density of the inverted neodymium ion population within the Nd doped fiber. Theoretical calculations of the gain signal indicate that the gain factor can be quite large, in the order of 15 dB for a single pass. A gain of 15 dB implies that a signal propagating along the laser rod undergoes an amplification by a factor of approximately 31.6.

Referring now to FIGS. 3 and 12 again, the amplification of the forward signal 114 clearly differs from the amplification of the backward signal 112. The forward signal 114 is emitted towards the output of the doped fiber rod 108 (rightmost doped fiber end 120) and undergoes an amplification by a factor of g. The forward signal has therefore a power P+ at the output of doped fiber which can be expressed by the following equation:

$$P^+ = P_o[e^g - 1] \quad (5)$$

where $P_o$ is the initial power of the signal launched into the doped fiber 108, g is the total gain and the factor 1 accounts for the loss of power required to induce superfluorescence.

The backward signal 112 undergoes amplification twice, firstly as it exits the doped fiber 108 towards the coupler 104 or 304 and secondly as it re-traverses the doped fiber 108 to be finally output. Simple theoretical calculations show that the power P− of the backward signal 114 at the output is:

$$P^- = P_o(e^{2g} - 1) \, \text{tm} \quad (6)$$

The reflection on the reflector 118 thus allows the amplification of the backward signal 112 to be far superior than the amplification of the forward signal 114. The forward signal 112 merely accounts for a small fraction of the total output. However, it is recalled that the filter function of the coupler does not apply to the forward signal 114. The forward signal 114, indeed, immediately exits the doped fiber without being filtered by any optical means. If the gain g is sufficiently large, the forward signal 114 is a negligible fraction of the output and therefore the temperature dependence of the unfiltered forward signal 114 does not have a substantial effect on the total output signal.

In the event the gain is reduced, the forward signal contribution is significant and, as a result, the temperature dependence of the unfiltered forward signal 114 may influence the temperature function of the total output signal.

To circumvent this difficulty, another embodiment of the present invention has been envisaged wherein both the forward signal and the backward signal are filtered by the coupler.

DESCRIPTION OF THIRD AND FOURTH EMBODIMENTS

Figure 16:
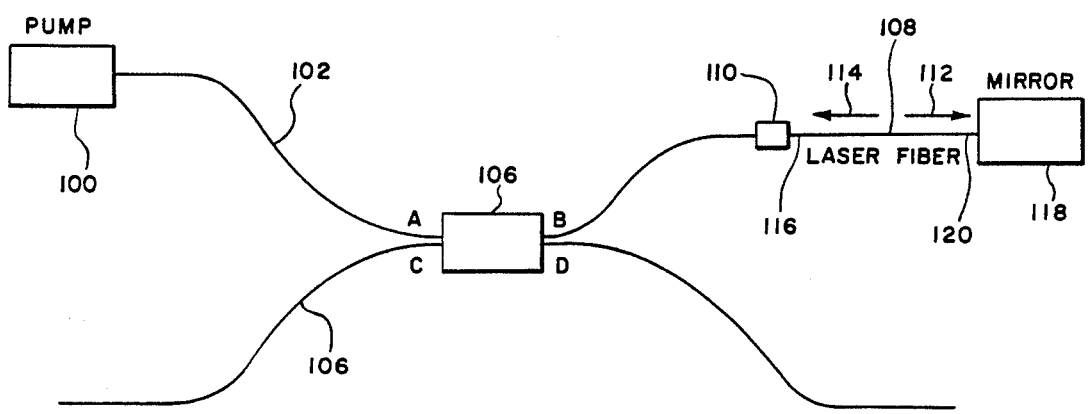
FIG. 16 is a schematic diagram illustrating a third embodiment of the present invention.
Figure 10:
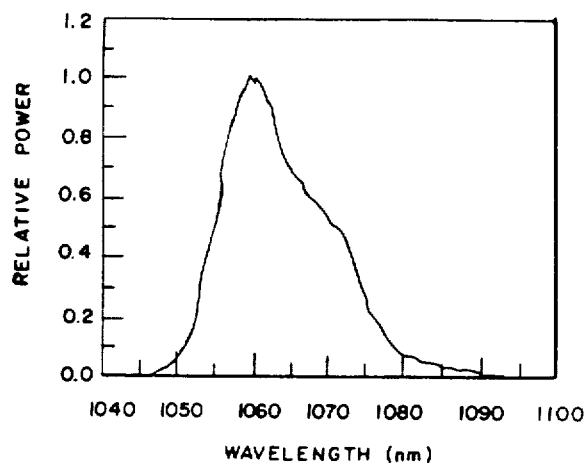
Figure 11A:
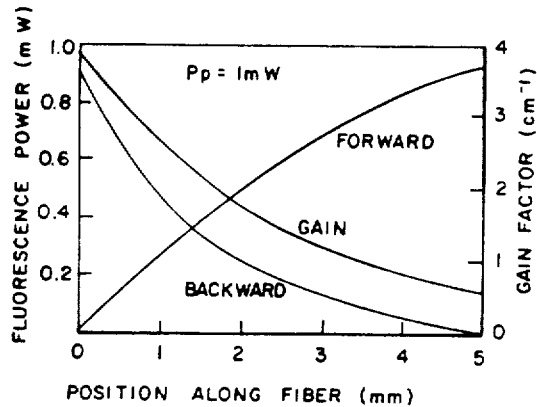
Figure 11B:
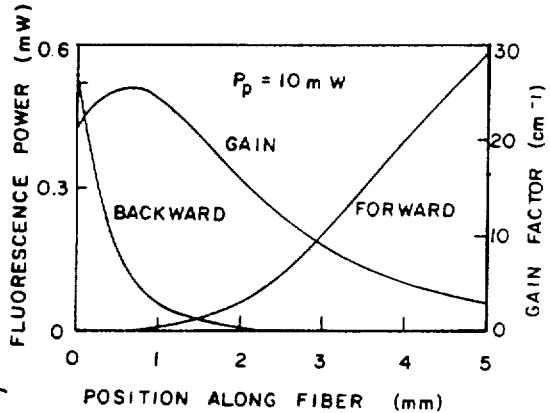
Figure 11C:
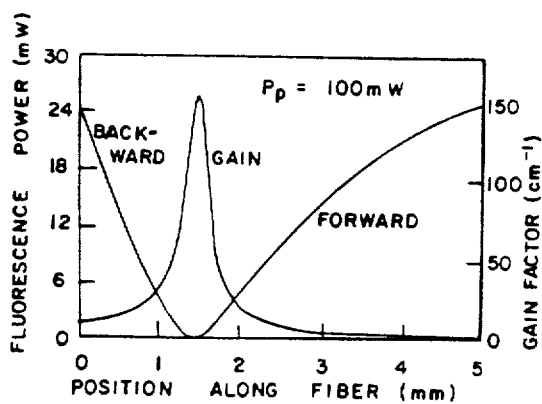

FIG. 16 illustrates a schematic representation of the third embodiment according to the present invention. The same optical components as described in conjunction with FIGS. 3 and 12 illustrating the first and second embodiments are utilized in this third embodiment. The system therefore comprises a pump source 100, two optical fibers 102 and 106, a doped fiber 108, a mirror 118 and a coupler 104. The mirror 118, however, is placed at one end 120 of the doped fiber 108, whereas the other end 116 of the fiber is coupled to the optical fiber 102, preferably by means of a splice 110, and further coupled to the coupler 104.

The overall system in the third embodiment thus functions in the following manner. The pump source signal is emitted by the pump source 100 and transmitted to the optical fiber 102 as the coupler 104 has been selected not to couple signals at the source wavelength. The doped fiber 108 superfluorescence in the conditions described hereabove and yields two components, a forward signal 114 and a backward signal 112 as indicated by the arrows in FIG. 16. The forward signal 114 (directed towards the left-hand side of the drawing) traverses the coupler 104 and is coupled to the optical fiber 106 as the coupler 104 is selected to 100% couple signals at the laser frequency. The output signal is collected on the optical fiber 106.

The backward signal 112 is reflected by the mirror 118 and output to the optical fiber 106 in the same way as the forward signal 114. It will, however, be recognized that both the forward and the backward signals are filtered once by the coupler. The filter function of the coupler can thereby decrease the temperature dependence of the total output signal for the reasons explained hereabove. Therefore, improved temperature stability results from the arrangement illustrated in FIG. 16. It is apparent that the net filter function of the output signal in the third embodiment of the present invention is different from the filter function in the first two embodiments illustrated in FIGS. 3 and 12. The total output signal in the system of FIG. 16 is indeed filtered once, whereas in the first and second embodiments, the backward component solely is filtered twice and the forward component remains unfiltered. All the advantages described in connection with the first two embodiments still apply to this third embodiment.

Another embodiment corresponding to the coupling arrangement described in conjunction with FIG. 12 is also envisionable. In this fourth embodiment, illustrated in FIG. 17, the properties of the coupler 304 are selected so that the coupler totally couples the pump source signal wavelength and essentially does not couple the laser signal wavelength. The doped fiber 108 and the mirror 118 are therefore coupled to the port D of the coupler 304. The pump signal is totally coupled to the doped fiber 108 via the coupler 304. The forward and backward components of the emitted laser signal are essentially uncoupled and transmitted to the optical fiber 106. All the advantages inherent to the previous embodiments are still valid (temperature dependence in particular).

DESCRIPTION OF THE FIFTH EMBODIMENT

A fifth embodiment using an all-fiber reflector incorporating a gyroscope-like loop of fiber can also be envisioned within the spirit of the present invention.

All-fiber reflectors are known in the art. In particular, a $Nd^{3+}$ doped cw fiber laser using all-fiber reflectors is disclosed in an article by J. D. Miller, et al., entitled "A $Nd^{3+}$-doped cw fiber laser using all-fiber reflectors," *Applied Optics*. Vol. 26, No. 11, pp. 2197-2201, June 1, 1987. This article is hereby incorporated herein by reference. Fiber reflectors are produced by looping back the outputs of a directional coupler. A passive all-fiber mirror has properties different from those of a typical dielectric or metal reflector. Light incident on the coupler is divided so that two portions of the field travel around the coupler in opposite directions. Light which couples across the coupler undergoes a $\pi/2$ phase lag.

In order to get a full understanding of the advantages presented by an all-fiber reflector, reference is made to FIG. 18 which is a schematic representation of an all-fiber mirror. The elements described in connection with FIGS. 3 and 12 are designated by the same numerals. In this reflector, a fiber 102, preferably a single-mode fiber, is used and looped back between two adjacent ports of a coupler 704. The coupler 704 is preferably a fused coupler. An input signal is injected from a source 100 into one port of the coupler 704. One component $I_1$, of the input signal does not cross the coupler 704 and circulates the loop counterclockwise. The other component $I_2$ circulates the loop counterclockwise with two cross-traverses of the coupler 704. These two components $I_1$ and $I_2$ are then output to form an output signal in a doped fiber 108 and a return signal in the fiber 102. Simple theoretical calculations show that the ratio $t$ of output to input fields $E_{out}/E_{in}$ is given by the following equation:

$$t=(1-2K)(1-\eta)\,exp[(-\alpha+j\beta)l] \tag{7}$$

wherein:
K is the intensity coupling ratio of the coupler;
$\eta$ is the intensity coupler loss;
$\alpha$ is the field loss;
$\beta$ is the propagation constant;
l is the total length of the loop; and
j is the complex number base.
The reflected signal consists of the superposition of two contradirectional components, each of which experiences one coupler traverse during the circuit. The ratio of output to input fields for the reflected signal is given by:

$$jr=(E_{out}/E_{in})=2jK^{\frac{1}{2}}(1-K)^{\frac{1}{2}}(1-\eta)exp\,[(-\alpha+j\beta)l] \tag{8}$$

A person skilled in the art will recognize that t is a real number whereas jr is an imaginary number. There is therefore a $\pi/2$ phase change on reflection. On transmission however, there is a zero phase change if $K<0.5$ and a $\pi$ phase change if $K>0.5$. The maximum reflectivity is given where $dR/dK=0$ which is satisfied for all fiber and coupler loss values when $K=\frac{1}{2}$.

Referring again to FIG. 18, which schematically represents the fifth embodiment of the present invention, a pump source 100 is coupled to the fiber 102 of the coupler 704 to provide pumping illumination at port A of the multiplexing coupler 704. The optical fiber 102 at ports B and D is looped back in the manner described hereabove so as to form an all-fiber reflector.

The fiber 102 at port C is coupled, e.g., butt-jointed or splice-fused, to a doped fiber 108 such as the one used in the previous embodiments. Preferably, the doped fiber 108 is a neodymium glass fiber (NGF). The geometrical parameters of the coupler are further selected so that the coupling ratio is 0.5 at the center wavelength of the doped fiber emission (corresponding to a coupling ratio of 3 dB) and so that the coupling ratio is 0 for the wavelength pump. The pump signal is therefore fully transmitted by the loop and fully coupled to the doped fiber. The coupler is, however, selected so that the laser signal is reflected with the maximum reflectivity (K=0.5). The reflected laser signal thus undergoes a $\pi/2$ phase change as shown in the above theoretical calculation regarding all-fiber reflectors. The reflection R of the all-fiber reflector is given by the equation:

$$R=4K(1-K)(1-\eta)^2 exp(-2\alpha l) \tag{9}$$

whereas the transmission T is given by:

$$T=(1-2K)^2(1-\eta)^2 exp(-2\alpha l) \tag{10}$$

If $K=\frac{1}{2}$, Equations (1) and (2) yield:

$$R=(1-\eta)^2 exp\,(-2\alpha l) \tag{11}$$

$$T=0 \tag{12}$$

Two results can be inferred from Equations (11) and (12). An all-fiber reflector with low losses can give close to complete reflection. The reflected laser signal is therefore circulated along the doped fiber and undergoes the filter effect of the multiplexing coupler, thereby resulting in better temperature stability. There is also reduced feedback on the signal path as the laser signal is not transmitted back to the pump (T=0).

In this embodiment, only the backward signal is filtered by the multiplexing coupler similarly to the first and second embodiments. However, it is apparent that if the gain is sufficiently large, the output signal is comprised almost entirely of the backward signal. It is also clear that all the advantages described in connection with the previous embodiments also apply in the case of an all-fiber reflector. This fifth embodiment does not utilize a dielectric mirror and has all the advantages of an all-fiber optical system.

DESCRIPTION OF SIXTH AND SEVENTH EMBODIMENTS

In the previous embodiments, one of the important features of the present invention resides in the filter function performed by the multiplexing coupler. Such filter function allows a greater temperature stability. It is possible to replace the multiplexing coupler used in the previous embodiments with an optical filter whose parameters have been properly selected with regard to transmission at particular wavelengths. Reference is now made to FIGS. 19 and 20 which represent in a schematic way, in the form of a block diagram, the two further embodiments according to the present invention.

In FIGS. 19 and 20, four blocks are represented, illustrating respectively a pump 100, a high reflectance mirror 118, a doped fiber 108 and a filter 804 having a selected temperature dependence. The system illustrated in FIG. 19 operates in the following manner. A pump source 100 emits a light signal illuminating a mirror 118. The mirror 118 is chosen to be transparent to the pump source wavelength. The mirror 118 is further coupled to a doped fiber 108. The transmitted pump signal illuminates the fiber 108, preferably an Nd:glass fiber (NGF), and produces superfluorescence if adequate pumping conditions are met. The laser signal has two components, a forward component 114 which is output at one end of the doped fiber 108 and a backward component 112. The mirror 118 is made reflective for the backward component wavelength and the backward component 112 is reflected back towards the output end of the doped fiber 108. The output laser signal is subsequently filtered by the filter 804 so that it becomes less temperature sensitive. In accordance with the aforementioned discussion of optical coupler temperature dependence, the temperature dependence of the filter is selected such that a signal emitted by the fiber source and filtered by the filter has a lower temperature dependence than an unfiltered laser signal.

In the embodiment illustrated in FIG. 20, the filter 804 is positioned between the mirror 118 and the doped fiber 108. Thus, the backward component 112 only is filtered by the filter 804. The backward component 112 traverses the filter 804 twice, the first time en route towards the mirror 118 and the second time on its way back to the output end of the doped fiber 108. This embodiment is particularly advantageous if the gain of the doped fiber is sufficiently high.

A variety of filters can be used in the embodiments illustrated in FIGS. 19 and 20. As indicated in the disclosure of the previous embodiments, a multiplexing coupler is well suited to act as a filter. However, any filter susceptible to decrease the temperature dependence of the superfluorescent output signal would be adequate.

Furthermore, it will be recognized by the person skilled in the art that the above-configuration illustrated in FIGS. 19 and 20 can be extended to any doped fiber source, whether non-resonant as disclosed in the preferred embodiments of the present invention (absence of mirrors on both sides of the fiber) or resonant (typical doped fiber provided with mirrors on both ends). In the embodiments illustrated in FIGS. 19 and 20, a second mirror (not shown) may be placed at the second end of the doped fiber 108, thereby inducing resonance in the fiber 108. The output signal emitted by the fiber source is subsequently filtered by the filter 804, which allows a dramatic reduction of the temperature dependence of the output signal. It will be understood by those skilled in the art that the superfluorescent nature of the output signal emitted by the fiber source does not play a role in the filtering effect produced by the filter, and thus the concepts discussed herein are broadly applicable to other types of light signals. Furthermore, the emission spectrum of the fiber source can have a broad bandwidth as in the preferred embodiments of the present invention or have a narrower bandwidth. Finally, the preferred embodiments of the present invention have been described using polished optical fiber couplers. It will also be understood that other types of couplers of the state of the art can be used such as integrated optics couplers, biconical-taper fused couplers, etc.

Whereas the present invention has been described with respect to specific embodiments thereof, it will be understood that various changes and modifications will be suggested to one skilled in the art and it is intended to encompass such changes and modifications as fall within the scope of the appended claims.

In the claims:

1. A fiber optic system, comprising:
   a source for emitting pumping light at a first spectrum of wavelengths;
   an optical fiber doped with a laser material, the intensity of said pumping light at said first spectrum of wavelengths being sufficient to induce superfluorescent emission of laser light in said laser material at a second spectrum of wavelengths, said laser light comprising first and second components, said first and second components being substantially contradirectional at locations where said laser light is emitted;
   an optical coupler having at least a first port and a second port, said first port coupled to said pump source to receive said pumping light from said pump source, said second port coupled to a first end of said doped optical fiber so that said pumping light coupled by said coupler from said first port into said second port is launched into said doped optical fiber, said coupler selectively coupling one of said first and second spectrum of wavelengths and inhibiting coupling of the other of said first and second spectrum of wavelengths; and
   a reflector for reflecting at least one of said first and second light components.

2. A fiber optic system as defined in claim 1, wherein said coupler provides substantially full coupling of said pumping light at said first spectrum of wavelengths and substantially inhibits coupling of said laser light at said second spectrum of wavelengths.

3. A fiber optic system as defined in claim 1, wherein said coupler provides substantially full coupling of said laser light at said second spectrum of wavelengths and substantially inhibits coupling of said pumping light at said first spectrum of wavelengths.

4. A fiber optic system as defined in either claim 2 or 3, wherein said reflector is coupled to a second end of said doped optical fiber, said laser light exiting said doped fiber via said first end of said doped fiber.

5. A fiber optic system as defined in claim 4, wherein said laser light exits said doped fiber via said coupler at another port of said coupler.

6. A fiber optic system as defined in claim 1, wherein said coupler provides substantially 50% coupling of said laser light at said second spectrum of wavelengths and substantially inhibits coupling of said pumping light at said first spectrum of wavelengths.

7. A fiber optic system as defined in claim 6, wherein said coupler has a third and a fourth port and wherein said reflector comprises an optical fiber forming a loop between said third and fourth ports.

8. A fiber optic system as defined in claim 1, wherein said coupler has a third port, said reflector being coupled to said coupler at said third port so as to reflect light emanating from said third port of said coupler back to said third port of said coupler.

9. The fiber optic system as defined in claim 1, wherein said doped optical fiber is a single-mode fiber doped with said laser material.

10. The fiber optic system as defined in claim 1, wherein said coupling of light in said coupler is due to evanescent field coupling.

11. The fiber optic system as defined in claim 1, wherein said first spectrum of wavelengths essentially comprises the wavelength at 806 nm.

12. The fiber optic system as defined in claim 1, wherein said second spectrum of wavelengths essentially comprises the wavelength at 1060 nm.

13. The fiber optic system as defined in claim 1, wherein said laser material comprises a rare earth ion and said doped optical fiber is made of a host glass selected from the group essentially consisting of alkali, alkaline earth silicates, silicates, germanates, phosphates or borate glasses.

14. The fiber optic system as defined in claim 13, wherein said rare earth ion is neodymium, ytterbium or erbium.

15. The fiber optic system as defined in claim 1, wherein said doped optical fiber is fused or spliced to an optical fiber for coupling with said second port of said coupler.

16. The fiber optic system as defined in claim 1, wherein said reflector comprises a dielectric mirror.

17. The fiber optic system as defined in claim 1, wherein said reflector comprises a metallic mirror.

18. The fiber optic system as defined in claim 1, wherein said source is a laser diode.

19. The fiber optic system as defined in claim 1, wherein said source is a dye laser.

20. A fiber optic light source, comprising:
an optical fiber doped with laser material absorbing light at a first spectrum of frequencies and emitting light at a second spectrum of frequencies; and
a coupler for directing light emitted from a pump source at said first spectrum of frequencies into one end of said doped optical fiber, the intensity of said pumping light being sufficient for inducing superfluorescent emission of light at said second spectrum of frequencies in said laser material, said coupler having a different coupling efficiency for said first spectrum of frequencies than for said second spectrum of frequencies.

21. A fiber optic light source as defined in claim 20, wherein said light emitted at said second spectrum of frequencies has a broad bandwidth.

22. An apparatus, comprising:
a source of pump light having a first spectrum of wavelengths;
an optical fiber comprising a laser material, said optical fiber emitting superfluorescent light at a second spectrum of wavelengths in response to pumping at said first spectrum of wavelengths; and
an optical coupler having an input port and an output port, said input port coupled to said pump source to receive light from said pump source, said output port coupled to said optical fiber for pumping said laser material, said coupler being wavelength discriminating so as to selectively couple one of said first and second spectrum of wavelengths and inhibit coupling of the other of said first and second spectrum of wavelengths.

23. The apparatus of claim 22, additionally comprising a reflector for reflecting light output from said coupler.

24. The apparatus of claim 23, wherein said reflector is at one end of said optical fiber.

25. The apparatus of claim 23, wherein said reflector is at a second output port of said coupler.

26. The apparatus of claim 25, wherein said reflector comprises a fiber loop.

27. A fiber optic system, comprising:
a pump source for emitting pumping light at a first spectrum of frequencies;
a coupler including a first and a second length of optical fiber juxtaposed to provide coupling of light between said first and second lengths, each of said first and second lengths of optical fiber having a first end portion and a second end portion, said pump source being coupled to said first end portion of said first length of optical fiber; and
an optical fiber doped with laser material, the intensity of said pumping light being sufficient to induce superfluorescent emission of laser light in said laser material at a second spectrum of frequencies when said laser material is pumped with said pumping light, said doped optical fiber coupled to one of said first and second lengths of optical fiber, said coupler having a different coupling efficiency for said first spectrum of frequencies than for said second spectrum of frequencies.

28. A fiber optic system as defined in claim 27, wherein said coupler utilizes evanescent field coupling.

29. A fiber optic system as defined in claim 27, wherein said coupling efficiency is substantially zero for said first spectrum of frequencies and substantially one for said second spectrum of frequencies.

30. A fiber optic system as defined in claim 26, wherein said doped fiber is coupled to said second end portion of said first length of optical fiber.

31. A fiber optic system as defined in claim 27, wherein said coupling efficiency is substantially one for said first spectrum of frequencies and substantially zero for said second spectrum of frequencies.

32. A fiber optic system as defined in claim 27, wherein said coupling efficiency is substantially zero for said first spectrum of frequencies and substantially 0.5 for said second spectrum of frequencies.

33. A fiber optic system as defined in claim 27, wherein said doped fiber is coupled to said second end portion of said second length of optical fiber.

34. A fiber optic system, comprising:
a pump source for emitting pumping light at a first spectrum of frequencies;
a coupler including a first and a second length of optical fiber juxtaposed to provide coupling of light between said first and second lengths, each of said first and second lengths of optical fiber having a first end portion and a second end portion, said pump source being coupled to said first end portion of said first length of optical fiber; and
an optical fiber doped with laser material, the intensity of said pumping light being sufficient to induce super fluorescent emission of laser light in said laser material at a second spectrum of frequencies when said laser material is pumped with said pumping light, said doped optical fiber coupled to one of said first and second lengths of optical fiber, said coupler having a different coupling efficiency for said first spectrum of frequencies than for said second spectrum of frequencies, wherein said laser light comprises at least a first and a second component, said first and second components being substantially contradirectional at locations where said laser light is emitted.

35. A fiber optic system as defined in claim 34, further comprising a reflector for reflecting one of said first and second laser light components.

36. A fiber optic system as defined in claim 35, wherein said reflector is coupled to one end of said doped optical fiber.

37. A fiber optic system as defined in claim 35, wherein said reflector is coupled to said first end portion of said second length of optical fiber.

38. A fiber optic system, comprising:
- a pump source for emitting pumping light at a first spectrum of frequencies;
- a coupler including a first and a second length of optical fiber juxtaposed to provide coupling of light between said first and second lengths, each of said first and second lengths of optical fiber having a first end portion and a second end portion, said pump source being coupled to said first end portion of said first length of optical fiber; and
- an optical fiber doped with laser material, the intensity of said pumping light being sufficient to induce superfluorescent emission of laser light in said laser material at a second spectrum of frequencies when said laser material is pumped with said pumping light, said doped optical fiber coupled to one of said first and second lengths of optical fiber, said coupler having a different coupling efficiency for said first spectrum of frequencies than for said second spectrum of frequencies, said coupling efficiency being substantially zero for said first spectrum of frequencies and substantially 0.5 for said second spectrum of frequencies and wherein said first and second lengths of optical fiber form a single, continuous strand of optical fiber, said optical fiber strand forming a loop portion and two line portions respectively connected to said pump source and said doped optical fiber.

39. A fiber optic system, comprising:
- a pump source for emitting pumping light at a first spectrum of frequencies;
- an optical fiber doped with laser material, the intensity of said pumping light being sufficient to induce emission of laser light in said laser material at a second spectrum of frequencies when said laser material is pumped with said pumping light, said laser light having at least a first and a second component;
- a filter for filtering at least one of said first and second components of said laser light, said filter having a selected low temperature dependence so that the laser light filtered by said filter is less temperature dependent than unfiltered laser light; and
- a reflector for reflecting at least one of said first and second components of said laser light.

40. A fiber optic system as defined in claim 39, wherein said laser light is induced by superfluorescence.

41. A fiber optic system as defined in claim 39, wherein said reflector is interposed between said pump source and said doped optical fiber, said reflector selectively transmitting said pumping light at said first spectrum of frequencies and reflecting said laser light at said second spectrum of frequencies.

42. A fiber optic system as defined in claim 39, wherein said doped optical fiber is interposed between said reflector and said filter.

43. A fiber optic system as defined in claim 39, wherein said filter is interposed between said reflector and said doped optical fiber.

44. A fiber optic system as defined in claim 39, further comprising a second reflector for forming a resonant cavity within said doped fiber.

45. A fiber optic system as defined in claim 39, wherein said laser light has a broad bandwidth.

46. A fiber optic system as defined in claim 39, wherein said laser light has a narrow bandwidth.

47. A method of producing light having low temporal coherence, comprising the steps of:
- providing a source of pumping illumination at a first spectrum of frequencies;
- pumping an optical fiber doped with laser material with said pumping illumination so as to produce emission of superfluorescent light in said laser material at a second spectrum of frequencies, said superfluorescent light having at least two components; and
- multiplexing said pumping illumination and said superfluorescent light in an optical coupler which is connected to said optical doped fiber and said source and which has a different coupling efficiency for said first spectrum of frequencies and said second spectrum of frequencies.

48. A method of producing light having low temporal coherence, comprising the steps of:
- providing a source of pumping illumination at a first spectrum of frequencies;
- pumping an optical fiber doped with laser material with said pumping illumination so as to produce emission of superfluorescent light in said laser material at a second spectrum of frequencies, said superfluorescent light having at least two components;
- multiplexing said pumping illumination and said superfluorescent light in an optical coupler which is connected to said optical doped fiber and said source and which has a different coupling efficiency for said first spectrum of frequencies and said second spectrum of frequencies; and
- reflecting at least one of said components of said superfluorescent light and directing said reflected component into said optical doped fiber.

49. A method of producing light having low temporal coherence and a low temperature dependence, comprising the steps of:
- providing a source of pumping illumination at a first spectrum of frequencies;
- pumping an optical fiber doped with laser material with said pumping illumination so as to produce emission of laser light in said laser material at a second spectrum of frequencies, said laser light having at least two components;
- filtering at least one of said first and second components of said laser light using a filter having a selected temperature dependence so that the filtered component has a lower temperature dependence than the unfiltered light; and
- reflecting at least one of said first and second components back into said doped optical fiber.

50. A method of producing light having low temporal coherence as defined in claim 49, wherein said pumping step comprises the step of inducing superfluorescence in said doped fiber.

51. A method of producing light having low temporal coherence and a low temperature dependence, comprising the steps of:
- providing a source of pumping illumination at a first spectrum of frequencies;
- pumping an optical fiber doped with laser material with said pumping illumination so as to produce emission of laser light in said laser material at a second spectrum of frequencies, said laser light having at least two components and a first temperature drift;

selecting an optical coupler having a predetermined second temperature drift substantially equal and of opposite direction to said first temperature drift of said laser light; and coupling at least one of said first and second components of said laser light using said coupler so as to produce a coupled component having a third temperature drift, whereby said third temperature drift of said coupled component is substantially cancelled or minimized.

52. An apparatus comprising:

a fiber optic coupler including a pair of topical fibers juxtaposed to provide coupling of light at a first spectrum of frequencies between said fibers and to prohibit coupling of light at a second spectrum of frequencies between said fibers;

a source of pumping illumination coupled to a first end of one of said pair of fibers, said pumping illumination having said first spectrum of frequencies; and a source of a signal to be amplified coupled to a first end of the other of said fibers, said signal to be amplified having said second spectrum of frequencies, and an optical fiber comprising a laser material, said laser material emitting superfluorescent light and possessing a laser transition at one of said second spectrum of frequencies of said signal to be amplified when said material is pumped with said pumping illumination, said optical fiber comprising said laser material being coupled at one end to a second end of one of said pair of fibers.

* * * * *

UNITED STATES PATENT AND TRADEMARK OFFICE
CERTIFICATE OF CORRECTION

PATENT NO. : 4,938,556

Page 1 of 2

DATED : July 3, 1990

INVENTOR(S) : Digonnet, et al

It is certified that error appears in the above-identified patent and that said Letters Patent is hereby corrected as shown below:

Add Figures 10, 11a, 11b and 11c which are missing from the patent. (as shown on the attached sheet)

In Column 1, line 21, after "temporal" add --coherence light signals such as optical gyroscopes, optical--

In Column 19, line 31, change "more" to --core--.

In Column 19, line 33, change "$\sigma_a$" to --$\alpha_a$--.

In Column 25, line 52, change "H value" to --value--.

In Column 26, line 18, change "$P^2coupler(\lambda)$" to --$P^2_{coupler(\lambda)}$--.

In Column 27, line 54, change "$(e^{2g}-1)tm(6)$" to --$(e^{2g}-1)$--, and add --(6)-- at the right margin.

In Claim 30, Column 34, line 28, change "as defined in claim 26" to --as defined in claim 29--.

Signed and Sealed this

Twenty-fifth Day of February, 1992

*Attest:*

HARRY F. MANBECK, JR.

*Attesting Officer*  Commissioner of Patents and Trademarks